United States Patent
Li

(10) Patent No.: US 11,096,212 B2
(45) Date of Patent: *Aug. 17, 2021

(54) DATA TRANSMISSION METHOD, TERMINAL DEVICE, BASE STATION, AND COMMUNICATIONS SYSTEM

(71) Applicant: Huawei Technologies Co., Ltd., Shenzhen (CN)

(72) Inventor: Chaojun Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 10 days.

This patent is subject to a terminal disclaimer.

(21) Appl. No.: 16/736,472

(22) Filed: Jan. 7, 2020

(65) Prior Publication Data
US 2020/0146047 A1    May 7, 2020

Related U.S. Application Data

(63) Continuation of application No. 15/893,057, filed on Feb. 9, 2018, now Pat. No. 10,548,163, which is a (Continued)

(51) Int. Cl.
*H04W 72/12* (2009.01)
*H04W 88/02* (2009.01)

(52) U.S. Cl.
CPC ... *H04W 72/1289* (2013.01); *H04W 72/1268* (2013.01); *H04W 88/02* (2013.01)

(58) Field of Classification Search
CPC ......... H04W 72/1268; H04W 72/1289; H04W 88/02; H04W 72/04; H04W 72/12;
(Continued)

(56) References Cited

U.S. PATENT DOCUMENTS 9,270,361 B2 * 2/2016 Suga .................. H04B 7/15542
9,510,335 B2 * 11/2016 Ko ........................ H04L 1/0061
(Continued)

FOREIGN PATENT DOCUMENTS

CN    101478808 A    7/2009
CN    102056198 A    5/2011
(Continued)

OTHER PUBLICATIONS

"3rd Generation Partnership Project; Technical Specification Group GSM/EDGE Radio AccessNetwork; Cellular System Support for Ultra Low Complexity and Low Throughput Internet of Things; (Release 13)," 3GPP TR 45.820 V1.4.0, pp. 1-384, 3rd Generation Partnership Project, Valbonne, France (Jul. 2015).
(Continued)

*Primary Examiner* — Robert J Lopata
(74) *Attorney, Agent, or Firm* — Leydig, Voit & Mayer, Ltd.

(57) ABSTRACT

A data transmission method includes: configuring, by a base station, first downlink control information (DCI) for a terminal device, where the first DCI includes scheduling information used for data transmission; sending, by the base station, the first DCI to the terminal device; configuring, by the base station, second DCI for the terminal device, where the second DCI includes first information, and the first information includes information used to indicate the terminal device to perform transmission of a first data packet with the base station according to the first DCI; sending, by the base station, the second DCI to the terminal device; and performing, by the base station, transmission of the first data packet with the terminal device.

18 Claims, 5 Drawing Sheets

Related U.S. Application Data continuation of application No. PCT/CN2015/086780, filed on Aug. 12, 2015.

(58) Field of Classification Search
CPC ... H04W 76/00; H04B 7/2121; H04B 7/2123; H04J 2203/0069; H04Q 2213/394
USPC .......................................................... 370/329
See application file for complete search history.

(56) References Cited

U.S. PATENT DOCUMENTS

| | | | |
|---|---|---|---|
| 9,712,272 B2* | 7/2017 | Zhu | H04L 5/0037 |
| 10,098,103 B2* | 10/2018 | Lim | H04W 72/042 |
| 2012/0201216 A1 | 8/2012 | Wu | |
| 2012/0314678 A1* | 12/2012 | Ko | H04W 72/10 370/329 |
| 2013/0003672 A1* | 1/2013 | Dinan | H04L 1/00 370/329 |
| 2013/0102342 A1* | 4/2013 | Tesanovic | H04B 7/0623 455/507 |
| 2013/0176981 A1* | 7/2013 | Earnshaw | H04L 1/02 370/329 |
| 2014/0133370 A1 | 5/2014 | Chen et al. | |
| 2014/0133440 A1* | 5/2014 | Zhang | H04W 72/042 370/329 |
| 2014/0169312 A1* | 6/2014 | Wang | H04W 48/12 370/329 |
| 2014/0307622 A1* | 10/2014 | Horn | H04W 28/10 370/328 |
| 2015/0016351 A1* | 1/2015 | Lee | H04L 1/1671 370/329 |
| 2015/0043397 A1* | 2/2015 | Hsieh | H04L 5/1469 370/280 |
| 2015/0131599 A1* | 5/2015 | Xue | H04W 72/042 370/329 |
| 2015/0172028 A1 | 6/2015 | Nam et al. | |
| 2015/0334660 A1* | 11/2015 | Hsieh | H04W 52/0274 370/328 |
| 2016/0007300 A1* | 1/2016 | Suzuki | H04W 52/221 370/329 |
| 2016/0013903 A1 | 1/2016 | Kim et al. | |
| 2016/0037524 A1* | 2/2016 | Krzymien | H04L 1/1896 370/329 |
| 2016/0204926 A1* | 7/2016 | Shi | H04L 5/0094 370/280 |
| 2016/0374060 A1* | 12/2016 | Lim | H04W 72/042 |
| 2017/0019882 A1* | 1/2017 | Nimbalker | H04W 72/042 |
| 2017/0019883 A1* | 1/2017 | Nimbalker | H04L 5/0053 |
| 2017/0019894 A1* | 1/2017 | Nimbalker | H04L 5/0053 |
| 2017/0019915 A1* | 1/2017 | Nogami | H04L 5/0053 |
| 2017/0180096 A1* | 6/2017 | Kim | H04L 1/1861 |
| 2017/0310447 A1* | 10/2017 | Kusashima | H04W 72/044 |
| 2018/0007667 A1* | 1/2018 | You | H04W 72/12 |
| 2018/0020430 A1* | 1/2018 | Aiba | H04L 5/0057 |
| 2018/0069644 A1* | 3/2018 | Zhu | H04L 5/0037 |
| 2018/0098334 A1* | 4/2018 | Tie | H04W 76/28 |
| 2018/0115986 A1* | 4/2018 | Aiba | H04L 5/0055 |
| 2018/0123769 A1* | 5/2018 | Pelletier | H04L 5/0094 |
| 2018/0241524 A1* | 8/2018 | Andersson | H04W 72/042 |
| 2018/0255536 A1* | 9/2018 | Suzuki | H04L 1/1812 |
| 2018/0270848 A1* | 9/2018 | Liang | H04W 72/1289 |
| 2019/0149638 A1* | 5/2019 | Desai | H04L 1/1854 370/329 |

FOREIGN PATENT DOCUMENTS

| | | |
|---|---|---|
| CN | 103427970 A | 12/2013 |
| CN | 104468030 A | 3/2015 |
| EP | 2632077 A2 | 8/2013 |
| EP | 2750429 A1 | 7/2014 |
| EP | 3179654 A1 | 6/2017 |
| KR | 20130083391 A | 7/2013 |
| KR | 20150084973 A | 7/2015 |
| WO | 2013022261 A2 | 2/2013 |
| WO | 2014148811 A1 | 9/2014 |

OTHER PUBLICATIONS

"DCI Overhead Reduction for CA," 3GPP TSG RAN WG1 Meeting #66, Athens, Greece, R1-112406, 3rd Generation Partnership Project, Valbonne, France (Aug. 22-26, 2011).
CN2015800814074 Search Report dated Jun. 19, 2019.
U.S. Appl. No. 15/893,057, filed Feb. 9, 2018.

* cited by examiner

DATA TRANSMISSION METHOD, TERMINAL DEVICE, BASE STATION, AND COMMUNICATIONS SYSTEM

CROSS-REFERENCE TO RELATED APPLICATIONS

This application is a continuation of U.S. patent application Ser. No. 15/893,057, filed on Feb. 9, 2018, which is a continuation of International Application No. PCT/CN2015/086780, filed on Aug. 12, 2015, the disclosures of which are hereby incorporated by reference in their entireties.

TECHNICAL FIELD

Examples of the present disclosure relate to the field of wireless communications, and more specifically, to a data transmission method, a terminal device, a base station, and a communications system.

BACKGROUND

With rapid development of communications technologies, a transmission time interval (TTI) of data needs to be shortened in a Long Term Evolution (LTE) system. In a current LTE system, duration of a subframe is 1 millisecond (ms), and each subframe is further divided into two 0.5-ms timeslots. For a normal cyclic prefix (normal CP), each timeslot includes seven orthogonal frequency division multiplexing (OFDM) symbols. For an extended cyclic prefix (extended CP), each timeslot includes six OFDM symbols. The OFDM symbol is abbreviated as a symbol below. In the current LTE system, a TTI is duration of a subframe, that is, 1 ms. With technology evolution, a short TTI that can be supported by data transmission may reach 1-timeslot duration or even 1-symbol duration. This poses a new requirement on a current data transmission mechanism.

In the LTE system, before receiving or sending service data, a terminal device needs to learn of downlink control information (DCI) configured by an evolved NodeB for the terminal device. The DCI is carried by using a physical downlink control channel (PDCCH).

A currently defined PDCCH such as a PDCCH defined in a release (Rel)-8 and an enhanced PDCCH (ePDCCH) defined in a Rel-11 is used to schedule a data packet whose TTI is 1 ms. Consequently, for a data packet whose TTI is less than 1 ms, the currently defined PDCCH cannot effectively work. By using the PDCCH defined in the Rel-8 as an example, the PDCCH is on the first symbol, the first two, the first three, or the first four symbols in a subframe. When a base station needs to re-configure scheduling information for the data packet after a fifth symbol in the subframe, this cannot be implemented on the PDCCH defined in the Rel-8. Therefore, for the data packet whose TTI is less than 1 ms, design of the current PDCCH needs to be improved to support communication of a short-TTI data packet.

SUMMARY

Examples of the present disclosure provide a data transmission method, a terminal device, a base station, and a communications system, so as to resolve a problem that a current PDCCH cannot support communication of data packet whose TTI is less than 1 ms.

According to a first aspect, a data transmission method is provided, including: configuring, by a base station, first DCI for a terminal device, where the first DCI includes scheduling information used for data transmission; sending, by the base station, the first DCI to the terminal device; configuring, by the base station, second DCI for the terminal device, where the second DCI includes first information, and the first information includes information used to indicate the terminal device to perform transmission of a first data packet with the base station according to the first DCI; sending, by the base station, the second DCI to the terminal device; and performing, by the base station, transmission of the first data packet with the terminal device.

With reference to the first aspect, in a first possible implementation, the second DCI further includes second information, and the second information includes information used to indicate the terminal device to perform transmission of a second data packet according to the first DCI; and the method further includes: performing, by the base station, transmission of the second data packet with the terminal device.

With reference to the first possible implementation of the first aspect, in a second possible implementation, the first data packet is a downlink data packet, the second data packet is an uplink data packet, the second DCI includes two information fields, one of the two information fields is used to carry the first information, and the other of the two information fields is used to carry the second information.

With reference to the first aspect, in a third possible implementation, the method further includes:

configuring, by the base station, third DCI for the terminal device, where the third DCI includes third information, and the third information includes information used to indicate the terminal device to perform transmission of a third data packet according to the first DCI; sending, by the base station, the third DCI to the terminal device; and performing, by the base station, transmission of the third data packet with the terminal device.

With reference to the first aspect, in a fourth possible implementation, when the first data packet is a downlink data packet, the performing, by the base station, transmission of the first data packet with the terminal device includes: when or after the base station sends the second DCI to the terminal device, sending, by the base station, the downlink data packet to the terminal device, where the downlink data packet and the second DCI occupy a completely same symbol or a partially same symbol.

With reference to the first aspect, in a fifth possible implementation, when the first data packet is an uplink data packet, the performing, by the base station, transmission of the first data packet with the terminal device includes: after the base station sends the second DCI to the terminal device, receiving, by the base station, the uplink data packet sent by the terminal device, where a first symbol occupied by the uplink data packet is a $k^{th}$ symbol following a last symbol occupied by the second DCI, and k is a positive integer.

With reference to the first aspect, in a sixth possible implementation, the method further includes: before the sending, by the base station, the first DCI to the terminal device, configuring, by the base station, a time period; and the sending, by the base station, the first DCI to the terminal device includes: sending, by the base station, the first DCI based on the time period.

With reference to the sixth possible implementation of the first aspect, in a seventh possible implementation, the time period is the same as a time period for reporting channel state information (CSI) by the terminal device, or is the same as a time period for reporting a wideband channel quality indicator (CQI) by the terminal device.

With reference to any one of the first aspect, or the first possible implementation to the seventh possible implementation, in an eighth possible implementation, the sending, by the base station, the first DCI to the terminal device includes: sending, by the base station, the first DCI to the terminal device in a physical downlink control channel area; and the sending, by the base station, the second DCI to the terminal device includes: sending, by the base station, the second DCI to the terminal device in a physical downlink shared channel area.

With reference to any one of the first aspect, or the first possible implementation to the eighth possible implementation, in a ninth possible implementation, the first DCI includes at least one piece of information of resource allocation (RA), a modulation and coding scheme (MCS), precoding, an antenna port, or a quantity of layers.

With reference to any one of the first aspect, or the first possible implementation to the ninth possible implementation, in a tenth possible implementation, the first DCI includes at least one set of scheduling information, and each of the at least one set of scheduling information includes the at least one piece of information of the resource allocation (RA), the modulation and coding scheme (MCS), the precoding, the antenna port, or the quantity of layers.

With reference to the tenth possible implementation of the first aspect, in an eleventh possible implementation, the at least one set of scheduling information further includes a set of scheduling information used to indicate the terminal device to send the CSI on a physical uplink shared channel (PUSCH), and the PUSCH does not carry an uplink shared channel (UL-SCH).

With reference to the tenth possible implementation or the eleventh possible implementation of the first aspect, in a twelfth possible implementation, when the base station configures at least two sets of scheduling information for the first DCI, the second DCI includes scheduling configuration indication information, and the scheduling configuration indication information indicates a set of scheduling information in the at least two sets of scheduling information that is to be used by the terminal device for data packet transmission.

With reference to any one of the first aspect, or the first possible implementation to the twelfth possible implementation, in a thirteenth possible implementation, the second DCI includes at least one piece of information of a hybrid automatic repeat request (HARQ) process number, a new data indicator (NDI), or a redundancy version (RV).

With reference to any one of the first aspect, or the first possible implementation to the thirteenth possible implementation, in a fourteenth possible implementation, the second DCI further includes channel state information (CSI) request information, and the CSI request information indicates whether the terminal device reports aperiodic CSI.

With reference to any one of the first aspect, or the first possible implementation to the fourteenth possible implementation, in a fifteenth possible implementation, the first data packet is a short-transmission time interval (TTI) data packet, and a TTI of the short-TTI data packet is less than a length of 1 subframe or less than 1 ms in a time domain.

With reference to the fifteenth possible implementation of the first aspect, in a sixteenth possible implementation, before the sending, by the base station, the first DCI to the terminal device, the method further includes: sending, by the base station, higher layer signaling to the terminal device, where the higher layer signaling indicates that the first data packet is the short-TTI data packet.

According to a second aspect of the present disclosure, a data transmission method is provided, including: receiving, by a terminal device, first DCI sent by a base station; obtaining, by the terminal device from the first DCI, scheduling information used for data transmission; receiving, by the terminal device, second DCI sent by the base station; obtaining, by the terminal device, first information from the second DCI, where the first information includes information used to indicate the terminal device to perform transmission of a first data packet with the base station according to the first DCI; and performing, by the terminal device, transmission of the first data packet with the base station.

With reference to the second aspect, in a first possible implementation, the second DCI further includes second information, and the method further includes: obtaining, by the terminal device, second information from the second DCI, where the second information includes information used to indicate the terminal device to perform transmission of a second data packet according to the first DCI; and performing, by the terminal device, transmission of the second data packet with the base station.

With reference to the first possible implementation of the second aspect, in a second possible implementation, the first data packet is a downlink data packet, the second data packet is an uplink data packet, the second DCI includes two information fields, one of the two information fields is used to carry the first information, and the other of the two information fields is used to carry the second information.

With reference to the second aspect, in a third possible implementation, the method further includes: receiving, by the terminal device, third DCI sent by the base station; obtaining, by the terminal device, third information from the third DCI, where the third information includes information used to indicate the terminal device to perform transmission of a third data packet according to the first DCI; and performing, by the terminal device, transmission of the third data packet with the base station.

With reference to the second aspect, in a fourth possible implementation, the performing, by the terminal device, transmission of the first data packet with the base station includes: when the first data packet is a downlink data packet, and when or after the terminal device receives the second DCI sent by the base station, receiving, by the terminal device, the downlink data packet sent by the base station, where the downlink data packet and the second DCI occupy a completely same symbol or a partially same symbol.

With reference to the second aspect, in a fifth possible implementation, the performing, by the terminal device, transmission of the first data packet with the base station includes: when the first data packet is an uplink data packet, and after the terminal device receives the second DCI sent by the base station, sending, by the terminal device, the uplink data packet to the base station, where a first symbol occupied by the uplink data packet is a $k^{th}$ symbol following a last symbol occupied by the second DCI, and k is a positive integer.

With reference to the second aspect, in a sixth possible implementation, the method further includes: before the terminal device receives the first DCI from the base station, receiving, by the terminal device, a time period configured by the base station; and the receiving, by a terminal device, first DCI sent by a base station includes: receiving, by the terminal device, the first DCI based on the time period.

With reference to the sixth possible implementation of the second aspect, in a seventh possible implementation, the time period is the same as a time period for sending channel state information (CSI) by the terminal device to the base station, or is the same as a time period for sending a wideband channel quality indicator (CQI) by the terminal device to the base station.

With reference to any one of the second aspect, or the first possible implementation to the seventh possible implementation, in an eighth possible implementation, the receiving, by a terminal device, first DCI sent by a base station includes: receiving, by the terminal device in a physical downlink control channel area, the first DCI sent by the base station; and the receiving, by the terminal device, second DCI sent by the base station includes: receiving, by the terminal device in a physical downlink shared channel area, the second DCI sent by the base station.

With reference to any one of the second aspect, or the first possible implementation to the eighth possible implementation, in a ninth possible implementation, the first DCI includes at least one piece of information of resource allocation (RA), a modulation and coding scheme (MCS), precoding, an antenna port, or a quantity of layers.

With reference to any one of the second aspect, or the first possible implementation to the ninth possible implementation, in a tenth possible implementation, the first DCI includes at least one set of scheduling information, and each of the at least one set of scheduling information includes the at least one piece of information of the resource allocation (RA), the modulation and coding scheme (MCS), the precoding, the antenna port, or the quantity of layers.

With reference to the tenth possible implementation of the second aspect, in an eleventh possible implementation, the at least one set of scheduling information further includes a set of scheduling information used to indicate the terminal device to send the CSI on a physical uplink shared channel (PUSCH), and the PUSCH does not carry an uplink shared channel (UL-SCH).

With reference to the tenth possible implementation or the eleventh possible implementation of the second aspect, in a twelfth possible implementation, when at least two sets of scheduling information are configured in the first DCI, the second DCI includes scheduling configuration indication information, and the scheduling configuration indication information indicates a set of scheduling information in the at least two sets of scheduling information that is to be used by the terminal device for data packet transmission.

With reference to any one of the second aspect, or the first possible implementation to the twelfth possible implementation, in a thirteenth possible implementation, the second DCI includes at least one piece of information of a hybrid automatic repeat request (HARQ) process number, a new data indicator (NDI), or a redundancy version (RV).

With reference to any one of the second aspect, or the first possible implementation to the thirteenth possible implementation, in a fourteenth possible implementation, the second DCI further includes channel state information (CSI) request information, and the CSI request information indicates whether the terminal device reports aperiodic CSI.

With reference to any one of the second aspect, or the first possible implementation to the fourteenth possible implementation, in a fifteenth possible implementation, the first data packet is a short-transmission time interval (TTI) data packet, and a TTI of the short-TTI data packet is less than a length of 1 subframe or less than 1 ms in a time domain.

With reference to the fifteenth possible implementation of the second aspect, in a sixteenth possible implementation, before the receiving, by a terminal device, first DCI sent by a base station, the method further includes: receiving, by the terminal device, higher layer signaling sent by the base station, where the higher layer signaling indicates that the first data packet is the short-TTI data packet.

According to a third aspect, a base station is provided, including: a processing unit, configured to configure first DCI for a terminal device, where the first DCI includes scheduling information used for data transmission; and a transceiver unit, configured to send the first DCI to the terminal device, where the processing unit is further configured to configure second DCI for the terminal device, where the second DCI includes first information, and the first information includes information used to indicate the terminal device to perform transmission of a first data packet with the base station according to the first DCI; and the transceiver unit is further configured to: send the second DCI to the terminal device, and perform transmission of the first data packet with the terminal device.

With reference to the third aspect, in a first possible implementation, the second DCI further includes second information, and the second information includes information used to indicate the terminal device to perform transmission of a second data packet according to the first DCI; and the transceiver unit is further configured to perform transmission of the second data packet with the terminal device.

With reference to the first possible implementation of the third aspect, in a second possible implementation, the first data packet is a downlink data packet, the second data packet is an uplink data packet, the second DCI includes two information fields, one of the two information fields is used to carry the first information, and the other of the two information fields is used to carry the second information.

With reference to the third aspect, in a third possible implementation, the processing unit is further configured to configure third DCI for the terminal device, where the third DCI includes third information, and the third information includes information used to indicate the terminal device to perform transmission of a third data packet according to the first DCI; and the transceiver unit is further configured to: send the third DCI to the terminal device, and perform transmission of the third data packet with the terminal device.

With reference to the third aspect, in a fourth possible implementation, that the transceiver unit is configured to perform transmission of the first data packet with the base station includes: when the first data packet is a downlink data packet, and when or after the transceiver unit sends the second DCI to the terminal device, the transceiver unit is specifically configured to send the downlink data packet to the terminal device, where the downlink data packet and the second DCI occupy a completely same symbol or a partially same symbol.

With reference to the third aspect, in a fifth possible implementation, that the transceiver unit is configured to perform transmission of the first data packet with the base station includes: when the first data packet is an uplink data packet, and after the transceiver unit sends the second DCI to the terminal device, the transceiver unit is specifically configured to receive the uplink data packet sent by the terminal device, where a first symbol occupied by the uplink data packet is a $k^{th}$ symbol following a last symbol occupied by the second DCI, and k is a positive integer.

With reference to the third aspect, in a sixth possible implementation, the processing unit is further configured to configure a time period before the transceiver unit sends the first DCI to the terminal device; and the transceiver unit is specifically configured to send the first DCI to the terminal device based on the time period.

With reference to the sixth possible implementation of the third aspect, in a seventh possible implementation, the time period is the same as a time period for sending channel state information (CSI) by the transceiver unit to the base station, or is the same as a time period for sending a wideband channel quality indicator (CQI) by the transceiver unit to the base station.

With reference to any one of the third aspect, or the first possible implementation to the seventh possible implementation, in an eighth possible implementation, that the transceiver unit sends the first DCI to the terminal device includes: sending, by the transceiver unit, the first DCI to the terminal device in a physical downlink control channel area; and that the transceiver unit sends the second DCI to the terminal device includes: sending, by the transceiver unit, the second DCI to the terminal device in a physical downlink shared channel area.

With reference to any one of the third aspect, or the first possible implementation to the eighth possible implementation, in a ninth possible implementation, the first DCI includes at least one piece of information of resource allocation (RA), a modulation and coding scheme (MCS), precoding, an antenna port, or a quantity of layers.

With reference to any one of the third aspect, or the first possible implementation to the ninth possible implementation, in a tenth possible implementation, the first DCI includes at least one set of scheduling information, and each of the at least one set of scheduling information includes the at least one piece of information of the resource allocation (RA), the modulation and coding scheme (MCS), the precoding, the antenna port, or the quantity of layers.

With reference to the tenth possible implementation of the third aspect, in an eleventh possible implementation, the at least one set of scheduling information further includes a set of scheduling information used to indicate the terminal device to send the CSI on a physical uplink shared channel (PUSCH), and the PUSCH does not carry an uplink shared channel (UL-SCH).

With reference to the tenth possible implementation or the eleventh possible implementation of the third aspect, in a twelfth possible implementation, when the processing unit configures at least two sets of scheduling information for the first DCI, the second DCI includes scheduling configuration indication information, and the scheduling configuration indication information indicates a set of scheduling information in the at least two sets of scheduling information that is to be used by the terminal device for data packet transmission.

With reference to any one of the third aspect, or the first possible implementation to the twelfth possible implementation, in a thirteenth possible implementation, the second DCI includes at least one piece of information of a hybrid automatic repeat request (HARQ) process number, a new data indicator (NDI), or a redundancy version (RV).

With reference to any one of the third aspect, or the first possible implementation to the thirteenth possible implementation, in a fourteenth possible implementation, the second DCI further includes channel state information (CSI) request information, and the CSI request information indicates whether the terminal device reports aperiodic CSI.

With reference to any one of the third aspect, or the first possible implementation to the fourteenth possible implementation, in a fifteenth possible implementation, the first data packet is a short-transmission time interval (TTI) data packet, and a TTI of the short-TTI data packet is less than a length of 1 subframe or less than 1 ms in a time domain.

With reference to any one of the third aspect, or the first possible implementation to the fourteenth possible implementation, in a sixteenth possible implementation, before the receiving, by a terminal device, first DCI sent by a base station, the transceiver unit is further configured to send higher layer signaling to the terminal device where the higher layer signaling indicates that the first data packet is the short-TTI data packet.

According to a fourth aspect of the present disclosure, a terminal device is provided, including: a transceiver unit, configured to receive first DCI sent by a base station; and a processing unit, configured to obtain, from the first DCI, scheduling information used for data transmission, where the transceiver unit is further configured to receive second DCI sent by the base station; the processing unit is further configured to obtain first information from the second DCI, where the first information includes information used to indicate the terminal device to perform transmission of a first data packet with the base station according to the first DCI; and the transceiver unit is further configured to perform transmission of the first data packet with the base station.

With reference to the fourth aspect, in a first possible implementation, the processing unit is further configured to obtain second information from the second DCI, where the second information includes information used to indicate the terminal device to perform transmission of a second data packet according to the first DCI; and the transceiver unit is further configured to perform transmission of the second data packet with the base station.

With reference to the first possible implementation of the fourth aspect, in a second possible implementation, the first data packet is a downlink data packet, the second data packet is an uplink data packet, the second DCI includes two information fields, one of the two information fields is used to carry the first information, and the other of the two information fields is used to carry the second information.

With reference to the fourth aspect, in a third possible implementation, the transceiver unit is further configured to receive third DCI sent by the base station; the processing unit is further configured to obtain third information from the third DCI, where the third information includes information used to indicate the terminal device to perform transmission of a third data packet according to the first DCI; and the transceiver unit is further configured to perform transmission of the third data packet with the base station.

With reference to the fourth aspect, in a fourth possible implementation, when the first data packet is a downlink data packet, that the transceiver unit is configured to perform transmission of the first data packet with the base station includes: when or after the transceiver unit receives the second DCI sent by the base station, the transceiver unit is specifically configured to receive the downlink data packet sent by the base station, where the downlink data packet and the second DCI occupy a completely same symbol or a partially same symbol.

With reference to the fourth aspect, in a fifth possible implementation, when the first data packet is an uplink data packet, that the transceiver unit is configured to perform transmission of the first data packet with the base station includes: after the transceiver unit receives the second DCI sent by the base station, the transceiver unit is specifically configured to send the uplink data packet to the base station, where a first symbol occupied by the uplink data packet is a $k^{th}$ symbol following a last symbol occupied by the second DCI, and k is a positive integer.

With reference to the fourth aspect, in a sixth possible implementation, before the transceiver unit receives the first DCI from the base station, the transceiver unit is further configured to receive a time period configured by the base station; and that the transceiver unit receives the first DCI sent by the base station includes: the transceiver unit is specifically configured to receive the first DCI based on the time period.

With reference to the sixth possible implementation of the fourth aspect, in a seventh possible implementation, the time period is the same as a time period for sending channel state information (CSI) by the transceiver unit to the base station, or is the same as a time period for sending a wideband channel quality indicator (CQI) by the transceiver unit to the base station.

With reference to any one of the fourth aspect, or the first possible implementation to the seventh possible implementation, in an eighth possible implementation, that the transceiver unit receives the first DCI sent by the base station includes: receiving, by the transceiver unit in a physical downlink control channel area, the first DCI sent by the base station; and that the transceiver unit receives the second DCI sent by the base station includes: receiving, by the transceiver unit in a physical downlink shared channel area, the second DCI sent by the base station.

With reference to any one of the fourth aspect, or the first possible implementation to the eighth possible implementation, in a ninth possible implementation, the first DCI includes at least one piece of information of resource allocation (RA), a modulation and coding scheme (MCS), precoding, an antenna port, or a quantity of layers.

With reference to any one of the fourth aspect, or the first possible implementation to the ninth possible implementation, in a tenth possible implementation, the first DCI includes at least one set of scheduling information, and each of the at least one set of scheduling information includes the at least one piece of information of the resource allocation (RA), the modulation and coding scheme (MCS), the precoding, the antenna port, or the quantity of layers.

With reference to the tenth possible implementation of the fourth aspect, in an eleventh possible implementation, the at least one set of scheduling information further includes a set of scheduling information used to indicate the terminal device to send the CSI on a physical uplink shared channel (PUSCH), and the PUSCH does not carry an uplink shared channel (UL-SCH).

With reference to the tenth possible implementation or the eleventh possible implementation of the fourth aspect, in a twelfth possible implementation, when at least two sets of scheduling information are configured in the first DCI, the second DCI includes scheduling configuration indication information, and the scheduling configuration indication information indicates a set of scheduling information in the at least two sets of scheduling information that is to be used by the terminal device for data packet transmission.

With reference to any one of the fourth aspect, or the first possible implementation to the twelfth possible implementation, in a thirteenth possible implementation, the second DCI includes at least one piece of information of a hybrid automatic repeat request (HARQ) process number, a new data indicator (NDI), or a redundancy version (RV).

With reference to any one of the fourth aspect, or the first possible implementation to the thirteenth possible implementation, in a fourteenth possible implementation, the second DCI further includes channel state information (CSI) request information, and the CSI request information indicates whether the terminal device reports aperiodic CSI.

With reference to any one of the fourth aspect, or the first possible implementation to the fourteenth possible implementation, in a fifteenth possible implementation, the first data packet is a short-transmission time interval (TTI) data packet, and a TTI of the short-TTI data packet is less than a length of 1 subframe or less than 1 ms in a time domain.

With reference to the fifteenth possible implementation of the fourth aspect, in a sixteenth possible implementation, before the transceiver unit receives the first DCI sent by the base station, the transceiver unit is further configured to receive higher layer signaling sent by the base station, where the higher layer signaling indicates that the first data packet is the short-TTI data packet.

According to a fifth aspect, a communications system is provided, including: a base station, configured to: configure first DCI, and send the first DCI, where the first DCI includes scheduling information used for data transmission, and the base station is further configured to: configure second DCI, and send the second DCI, where the second DCI includes first information; and a terminal device, configured to: receive the first DCI, and perform transmission of a first data packet with the base station according to a notification of the first information in the second DCI and according to the first DCI.

In the examples of the present disclosure, by using a mechanism in which first-order downlink control information (DCI) and second-order downlink control information (DCI) are separately sent, the first-order DCI is used to indicate scheduling information used when the terminal device receives/sends a data packet, and the second-order DCI is used to indicate the terminal device to receive/send a data packet. Therefore, a technical problem that a current PDCCH cannot support a data packet whose TTI is less than 1 ms is resolved, and the terminal device is flexibly scheduled to send/receive the data packet in terms of time, so as to improve data transmission performance.

BRIEF DESCRIPTION OF DRAWINGS

To describe the technical solutions in the examples of the present disclosure more clearly, the following briefly describes the accompanying drawings required for describing the examples. Apparently, the accompanying drawings in the following description show merely some examples of the present disclosure, and a person of ordinary skill in the art may still derive other drawings from these accompanying drawings without creative efforts.

DETAILED DESCRIPTION

The following clearly describes the technical solutions in the examples of the present disclosure with reference to the accompanying drawings in the examples of the present disclosure. Apparently, the described examples are some but not all of the examples of the present disclosure. All other examples obtained by a person of ordinary skill in the art based on the examples of the present disclosure without creative efforts shall fall within the protection scope of the present disclosure.

The technical solutions of the present disclosure may be applied to various communications systems such as a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

A terminal device may also be referred to as a mobile terminal, a mobile terminal device, or the like, and may communicate with one or more core networks by using a radio access network (RAN). The terminal device may be a mobile terminal such as a mobile phone (or referred to as a "cellular" phone) or a computer having a mobile terminal. For example, the terminal device may be a portable, pocket-sized, handheld, computer built-in, or in-vehicle mobile apparatus that exchanges voice and/or data with the radio access network.

A base station may be a base transceiver station (BTS) in the GSM or the CDMA, a NodeB in the WCDMA, or an evolved NodeB (eNB or eNodeB) in the LTE. This is not limited in the present disclosure.

To make the present disclosure more clearly, brief description is first provided below:

In an LTE system, downlink data is transmitted by using a physical downlink shared channel (PDSCH), and uplink data is transmitted by using a physical uplink shared channel (PUSCH). Before receiving downlink data or sending uplink data, a terminal device needs to know scheduling information such as time-frequency resource allocation or a modulation and coding scheme that is configured by a base station for the terminal device. In addition, the base station also needs to notify the terminal device of power control command information related to uplink transmission. The scheduling information and the power control command information are downlink control information (DCI). Optionally, the DCI is carried by using a physical downlink control channel (PDCCH).

It should be noted that the examples of the present disclosure are applicable to a short-TTI data packet. For example, in LTE, the short-TTI data packet is a data packet whose TTI is between 1-symbol duration and 0.5 ms. Alternatively, in a future 5G system or another evolved system, the short-TTI data packet is a data packet whose TTI is less than 1 ms.

Figure 1:
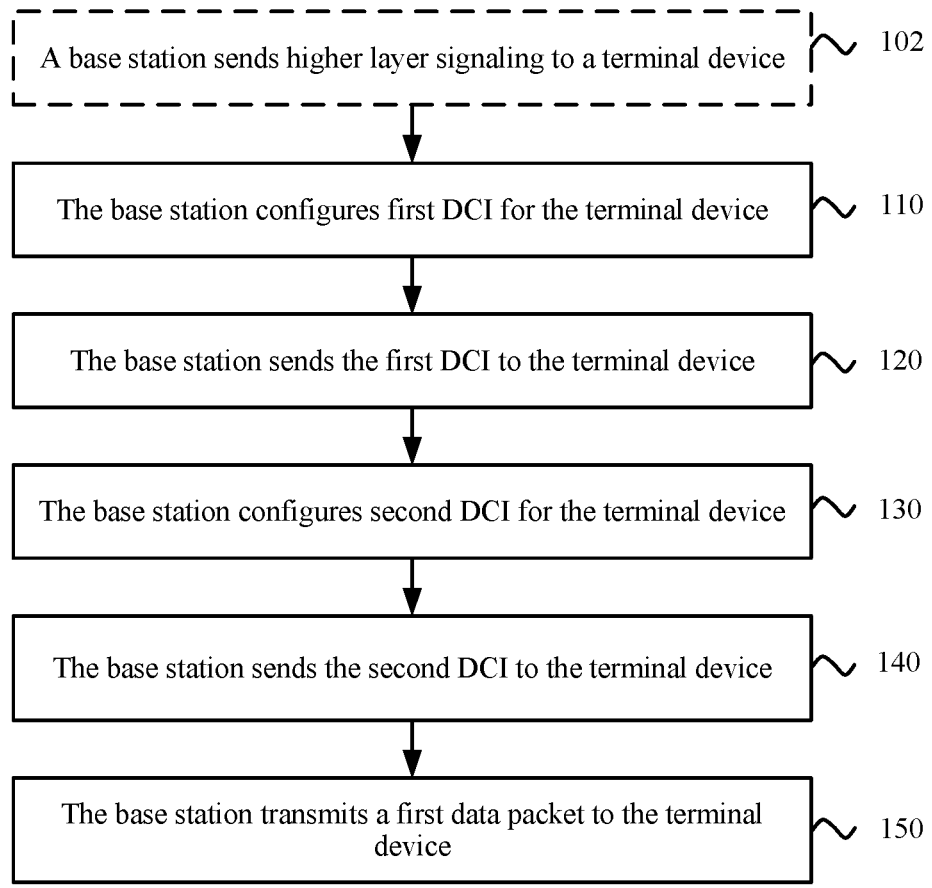
FIG. 1 is a schematic flowchart of a data transmission method according to an example of the present disclosure.

FIG. 1 is a schematic flowchart of a data transmission method according to an example of the present disclosure. The method in FIG. 1 may be performed by a base station.

Step 110: The base station configures first downlink control information (DCI) for a terminal device, where the first DCI includes scheduling information used for data transmission. The data transmission includes downlink data transmission and/or uplink data transmission. That is, the data transmission includes: the terminal device receives one or more downlink data packets and/or sends one or more uplink data packets.

Optionally, in an example, the first DCI includes at least one piece of information of resource allocation (RA), a modulation and coding scheme (MCS), precoding, an antenna port, or a quantity of layers (number of layers). The RA indicates a resource allocated to the terminal device. For example, the base station indicates, by using a resource index, a resource that is available when the terminal device receives a downlink data packet and/or sends an uplink data packet. In LTE, a transmission rate may be configured by configuring the MCS. For example, a data packet may usually use a modulation scheme such as quadrature phase shift keying (QPSK), 16 QAM, 64 QAM, or 256 QAM according to a quadrature amplitude modulation (QAM). The base station may indicate a specific modulation and coding scheme of the data packet to the terminal device by using the MCS.

In addition, in an LTE system, a multiple-input multiple-output (MIMO) technology may be used to increase a system capacity and improve a throughput rate. The base station may indicate, to the terminal device by using the precoding, the antenna port, and the quantity of layers (number of layers), precoding information and/or a reference signal that are/is required by a MIMO transmission mode.

Scheduling information indicated by information such as the RA, the MCS, the precoding, the antenna port, and the quantity of layers does not need to change based on a symbol level. That is, when indicating the terminal device to receive the downlink data packet or send the uplink data packet, the base station does not need to send the first DCI each time to indicate the scheduling information to the terminal device. Optionally, the base station may send the first DCI to the terminal device based on a time period T.

Optionally, in an example, the base station configures the time period T, and sends the first DCI to the terminal device based on the time period T. For example, the base station sends the first DCI to the terminal device at an interval of the time period T. Optionally, the base station sends, to the terminal device, signaling indicating the time period T.

Optionally, in another example, the base station may send the first DCI in a semi-persistent sending manner. In this case, the base station sends the first DCI to the terminal device based on the time period T. For example, the base station detects, at an interval of a time period, whether the first DCI is updated, and sends the first DCI to the terminal device when the first DCI is updated.

Optionally, the time period T may be configured according to a time period for reporting channel information by the terminal device. The channel information is channel state information (CSI) or a wideband channel quality indicator (CQI). The base station needs to adjust, in a timely manner according to the CSI or the wideband CQI reported by the terminal device, information included in the first DCI. Therefore, preferably, the time period T may be the same as a period for sending the CSI by the terminal device to the base station, or the time period T may be the same as a period for sending the wideband CQI by the terminal device to the base station. The CSI includes a CQI, a precoding matrix indicator (PMI), and/or a rank indication (RI). For example, when the CSI is the CQI, the time period T may be the same as a period for sending the CQI by the terminal device to the base station. When the CQI includes a subband CQI and a wideband CQI, a period of the CQI is less than a period of the wideband CQI.

Optionally, the first DCI includes at least one set of scheduling information, and each set of scheduling information includes the at least one piece of information of the RA, the MCS, the precoding, the antenna port, or the quantity of layers (number of layers). Different sets of scheduling information include information of different RA, different MCSs, different precoding, different antenna ports, or different numbers of layers. For example, a first set of scheduling information in the first DCI includes at least one of first resource allocation (RA) information, a first modulation and coding scheme (MCS), first precoding, a first antenna port, or a first number of layers, and a second set of scheduling information in the first DCI includes at least one of second resource allocation (RA) information, a second modulation and coding scheme (MCS), second precoding, a second antenna port, or a second number of layers. The different sets of scheduling information are different scheduling information used when the terminal device is indicated to receive the downlink data packet and/or send the uplink data packet. Optionally, when the base station configures that the first DCI includes at least two sets of scheduling information, the base station may dynamically indicate, in second DCI, a set of scheduling information that is to be used. Configuration of the second DCI is further described in step 130. When a first PDCCH is group-specified, preferably, the first DCI includes at least two sets of scheduling information.

Optionally, two cases exist: the first DCI may be used to schedule downlink data, and the first DCI may be used to schedule uplink data.

In a first case, the first DCI is used to schedule the downlink data, that is, the first DCI is used to indicate scheduling information used when the terminal device receives the downlink data packet.

Optionally, in this case, the first DCI includes at least one piece of information of the RA or the MCS, and further includes at least one piece of information of the precoding, the antenna port, or the quantity of layers.

In a second case, the first DCI is used to schedule the uplink data, that is, the first DCI is used to indicate scheduling information used when the terminal device sends the uplink data packet.

Optionally, in this case, the first DCI includes at least one piece of information of the RA or the MCS, and further includes at least one piece of information of the precoding or the quantity of layers.

Optionally, in the second case, the first DCI includes a set of scheduling information used to indicate the terminal device to individually send the CSI on a PUSCH. That is, on the PUSCH, the terminal device does not send a transport block for carrying an uplink shared channel (UL-SCH), but sends only a control information feedback of a report mode of a current PUSCH. The set of scheduling information includes information such as the RA, the MCS, and an RV. Preferably, the MCS and the RV are in an information field of DCI, that is, an MCS and RV field. Usually, the information field occupies 5 bits. For example, a bit value of the MCS and RV field may be "11101", that is, a decimal value of the MCS and RV field is 29. A quantity of physical resource blocks (PRB, Physical RB) indicated in an RA field is set to be less than or equal to 4 or 20. When the quantity of PRBs is set to be less than or equal to 4, the terminal device reports aperiodic CSI of only one serving cell. When the quantity of PRBs is set to be less than or equal to 20, the terminal device reports aperiodic CSI of more than one serving cell. Optionally, in this case, the second DCI may include information indicating the set of scheduling information, and configuration of the second DCI is further described in step 130.

Optionally, the first DCI may be used to individually schedule the downlink data or the uplink data. In this case, the first DCI further needs to include hybrid automatic repeat request (HARQ)-related information.

In conclusion, according to step 110, the base station configures the first DCI for the terminal device, and the first DCI includes the scheduling information used for data transmission.

Step 120: The base station sends the first DCI to the terminal device.

Optionally, the base station sends the first DCI by carrying the first DCI on a first physical downlink control channel (PDCCH), and the first PDCCH is in a PDCCH area.

Correspondingly, step 120 may include: configuring, by the base station, the first PDCCH, where the first PDCCH is used to carry the first DCI, and sending, by the base station, the first DCI to the terminal device by using the first PDCCH. The first PDCCH for carrying the first DCI is not used to carry the second DCI, and the second DCI is further described in step 130.

Preferably, the PDCCH area and a PDSCH area are based on time division, that is, the PDCCH area and the PDSCH area are on different symbols. The downlink data packet transmitted by the base station to the terminal device is carried by using a PDSCH. The PDCCH area is formed by symbols used to transmit a PDCCH, and one PDCCH area may include multiple PDCCHs. The PDSCH area is formed by symbols used to transmit a PDSCH. For example, the first PDCCH is a PDCCH defined in a Rel-8. When a downlink system bandwidth is less than or equal to 10 resource blocks (RB), the PDCCH area includes the first two, the first three, or the first four symbols in each subframe. When a downlink system bandwidth is greater than 10 RBs, the PDCCH area includes the first OFDM symbol, or the first two or the first three OFDM symbols in each subframe. A quantity of symbols of the PDCCH area may be indicated by using a physical control format indicator channel (PCFICH) or higher layer signaling. The higher layer signaling is from a higher layer and with lower sending frequency compared with physical layer signaling, and includes Radio Resource Control (RRC) signaling and Media Access Control (MAC) signaling. The PDSCH area includes a symbol other than that of the PDCCH area in each subframe. A quantity of symbols of the PDSCH area may be indicated by using the PCFICH or the higher layer signaling.

Optionally, the PDCCH area and the PDSCH area are based on frequency division, that is, the first PDCCH is an ePDCCH defined in a Rel-11.

Optionally, the first PDCCH may be terminal device-specified or group-specified. When the first PDCCH is terminal device-specified, a cyclic redundancy check (CRC) used for the first PDCCH is scrambled by using a terminal device-specific radio network temporary identifier (RNTI), for example, a cell radio network temporary identifier (C-RNTI) or a semi-persistent scheduling C-RNTI (SPS C-RNTI). Optionally, multiple terminal devices with a same RNTI may be used as a group of terminal devices. When the first PDCCH is group-specified, a CRC used for the first PDCCH is scrambled by using an RNTI specific to this group of terminal devices. Because channel environments of different terminal devices are different, configured scheduling information is also different.

Step 130: The base station configures second DCI for the terminal device, where the second DCI includes first information. The first information includes information used to indicate the terminal device to perform transmission of a first data packet with the base station according to the first DCI.

Optionally, the second DCI includes at least one piece of information of a HARQ process number, a new data indicator (NDI), or a redundancy version (RV).

The HARQ process number is a sequence number used to identify a HARQ process. A HARQ may be classified into two types: a synchronized HARQ and an asynchronized HARQ according to a moment at which retransmission occurs. In the synchronized HARQ, transmission/retransmission in a HARQ process occurs at a fixed moment. Because a receive end knows, in advance, a moment at which transmission occurs, extra signaling overheads are not required to identify a sequence number of the HARQ process. In this case, a HARQ process number may be obtained from a sequence number of a symbol. In the asynchronized HARQ, transmission in a HARQ process may occur at any time. A receive end does not know, in advance, a time at which transmission occurs. Therefore, a HARQ process number needs to be sent.

An NDI value is stored in each HARQ process. Optionally, the value uses 1 bit to indicate whether scheduled data is newly transmitted or retransmitted. If an NDI value in a same HARQ process is different from a previous value (NDI toggled), it indicates that current transmission is initial transmission of a new data packet. If an NDI value in a same HARQ process is the same as a previous value (NDI not toggled), it indicates that current transmission is retransmission of a same data packet.

The RV is used to indicate a redundancy version used for data transmission.

Optionally, the first DCI may be defined as first-order DCI, and the first DCI or the first-order DCI includes scheduling information used when the terminal device configures a data packet transmitted within a period of time. Regardless of a quantity of data packets that are sent within the period of time, the scheduling information included in the first DCI may be used. Likewise, optionally, it is defined that second-order DCI includes the second DCI, third DCI, and the like. When the second-order DCI is used to indicate the terminal device to receive the downlink data packet or send the uplink data packet, each DCI is used to indicate to transmit a data packet. For example, the second DCI is used to indicate to transmit a first data packet, and the third DCI is used to indicate to transmit a second data packet. That is, after receiving a notification of the second DCI, the terminal device performs transmission of the first data packet with the base station according to scheduling information included in the first DCI and the second DCI. After receiving a notification of the third DCI, the terminal device performs transmission of the second data packet with the base station according to scheduling information included in the first DCI and the third DCI. When the second-order DCI is used to indicate the terminal device to receive the downlink data packet and send the uplink data packet, the second-order DCI may be used to indicate to transmit the two data packets. For example, a first message in the second DCI is used to indicate to receive the first data packet, that is, the downlink data packet, and a second message in the second DCI is used to indicate to send the second data packet, that is, the uplink data packet. That is, after receiving a notification of the second DCI, the terminal device receives the first data packet according to the scheduling information included in the first DCI and the second DCI. After receiving a notification of the third DCI, the terminal device sends the second data packet according to the scheduling information included in the first DCI and the third DCI.

Optionally, the base station may configure the first-order DCI and the second-order DCI at the same time. The base station preferably sends the first-order DCI, and then sends the second-order DCI. That is, the first DCI should be sent before the second DCI, the third DCI, and the like. Likewise, optionally, the base station may first configure the first-order DCI, and then send the first-order DCI. Next, the base station may configure the second-order DCI before sending the second-order DCI each time. It may be understood that, when two pieces of DCI: the first-order DCI and the second-order DCI are used for scheduling when each data packet is transmitted, a specific configuration sequence and a sending sequence of the first-order DCI and the second-order DCI are not limited in the present disclosure.

Optionally, the first PDCCH for carrying the first-order DCI is not used to carry the second-order DCI.

The second-order DCI is used to indicate the terminal device to receive the downlink data packet and/or send the uplink data packet. Because a transmission requirement of the downlink data packet and/or the uplink data packet occurs in real time, the base station needs to dynamically send the second-order DCI to the terminal device according to a requirement. In a case of a short-TTI data packet, the second-order DCI may change based on a symbol level. For example, when the short-TTI data packet is a data packet whose TTI is 1 symbol, the second-order DCI may be sent on each symbol.

A status of the second-order DCI is described below by using the second DCI as an example.

As described above, three cases exist: the second DCI may be used to indicate the terminal device to receive the downlink data packet, the second DCI may be used to indicate the terminal device to send the uplink data packet, and the second DCI may be used to indicate the terminal device to receive the downlink data packet and send the uplink data packet. The three cases are described below.

In a first case, the second DCI is used to indicate the terminal device to receive the downlink data packet.

In this case, when or after the base station sends the second DCI to the terminal device, the base station sends the downlink data packet to the terminal device. It should be understood that, when the downlink data packet and the second DCI that are sent by the base station to the terminal device occupy a completely same symbol or a partially same symbol, it may be considered that the base station sends the downlink data packet when sending the second DCI to the terminal device. For example, when a downlink short-TTI data packet occupies one symbol, the second DCI and the downlink short-TTI data packet are on the symbol. That is, the base station sends the second DCI and the downlink short-TTI data packet on the symbol. When the downlink short-TTI data packet occupies at least two symbols, the second DCI and the downlink short-TTI data packet occupy a completely same symbol or a partially same symbol.

Alternatively, optionally, the second DCI sent by the base station is used to notify the terminal device of a downlink data packet that needs to be received later. For example, the base station sends a short-TTI data packet on a $k^{th}$ symbol following a last symbol occupied by the second DCI, and k is a positive integer. Alternatively, the base station sends a short-TTI data packet on an $n^{th}$ symbol following a first symbol occupied by the second DCI, and n is a positive integer greater than a quantity of symbols occupied by DCI. For example, if the DCI occupies two symbols, n is a positive integer greater than 2. In this case, it may be considered that the base station sends the downlink data packet after sending the second DCI to the terminal device.

In a second case, the second DCI is used to indicate the terminal device to send the uplink data packet.

The second DCI is at a downlink TTI, and an uplink short-TTI data packet sent by the terminal device to the base station is at an uplink TTI. Because the terminal device requires a period of processing time to interpret the second DCI and prepare the uplink short-TTI data packet, the second DCI should be sent before the uplink short-TTI data packet. For example, the base station receives, on a $k^{th}$ symbol following a last symbol occupied by the second DCI, the uplink short-TTI data packet sent by the terminal device, and k is a positive integer. Alternatively, the base station receives, on an $n^{th}$ symbol following a first symbol occupied by the second DCI, the uplink short-TTI data packet sent by the terminal device, and n is a positive integer greater than a quantity of symbols occupied by DCI. For example, if the DCI occupies 2 symbols, n is a positive integer greater than 2.

Optionally, when the uplink short-TTI data packet uses the synchronized HARQ, the second DCI includes at least one piece of information of the NDI or the RV. Optionally, when the uplink short-TTI data packet uses the asynchronized HARQ, the second DCI includes the at least one piece of information of the HARQ process number, the NDI, or the RV.

Optionally, when the first DCI includes at least two sets of scheduling information, the second DCI further includes a scheduling configuration indication. The scheduling configuration indication is used to notify the terminal device of a set of scheduling information that is to be used by the terminal device to receive the downlink data packet and/or send the uplink data packet. For example, if the first DCI includes two sets of scheduling information, the second DCI may further include a 1-bit scheduling configuration indication. When the 1-bit scheduling configuration indication is "0", a first set of scheduling information is used, and when the 1-bit scheduling configuration indication is "1", a second set of scheduling information is used.

Optionally, the second DCI may further include CSI request information. A CSI request is 1 bit or 2 bits, and is used to indicate whether the terminal device reports an aperiodic CSI. When the CSI request information configured by the base station is that the terminal device does not report the aperiodic CSI, the terminal device does not send the aperiodic CSI, but sends only the transport block for carrying the UL-SCH. When the CSI request information configured by the base station is that the terminal device reports the aperiodic CSI, the terminal device sends the aperiodic CSI and the transport block for carrying the UL-SCH.

It should be noted that, when the first DCI includes a set of scheduling information used by the terminal device to individually send the CSI on the PUSCH, the base station may configure that the scheduling configuration indication in the second DCI is using the set of scheduling information, and/or, the base station configures that the CSI request information is indicating the terminal device to report the aperiodic CSI, and indicating the terminal device to individually send the CSI on the PUSCH.

In a third case, the second DCI is used to indicate the terminal device to receive the downlink data packet and send the uplink data packet.

The second DCI includes two information fields. One information field indicates the terminal device to receive the downlink data packet, and includes information described in the first case, for example, includes the at least one piece of information of the HARQ process number, the NDI, or the RV. The other information field indicates the terminal device to send the uplink data packet, and includes information described in the second case, for example, includes at least one piece of information of the NDI, the RV, or the CSI request when the uplink short-TTI data packet uses the synchronized HARQ, or includes at least one piece of information of the HARQ process number, the NDI, the RV, or the CSI when the uplink short-TTI data packet uses the asynchronized HARQ.

In this case, the base station configures the second DCI, and the second DCI is used to indicate the terminal device to send the uplink short-TTI data packet and receive the downlink short-TTI data packet. Optionally, the second DCI further includes second information, and the second information includes information used to indicate the terminal device to perform transmission of a second data packet according to the first DCI. The second data packet is the downlink short-TTI data packet.

The second DCI is sent before the uplink short-TTI data packet that needs to be sent by the terminal device. Because the first DCI is scheduling information used when the terminal device is indicated to receive the downlink data packet and/or send the uplink data packet, when receiving or sending a data packet, the base station does not need to send the first DCI each time. Because the second DCI is used to indicate the terminal device to receive the downlink data packet and/or send the uplink data packet, the base station sends the second DCI before or when receiving or sending a data packet each time.

Figure 2:
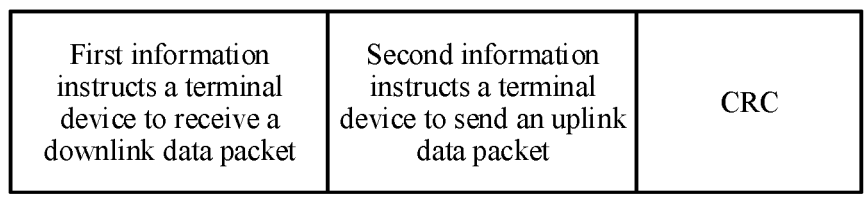
FIG. 2 is a schematic diagram of a physical downlink control channel (PDCCH) configuration format according to an example of the present disclosure.

It should be noted that, when the PDCCH is used to carry the second DCI (for details, refer to a scheme 1 of step 140 in FIG. 1), if two PDCCHs are used to respectively indicate to send the uplink data and receive the downlink data, two CRCs are required. If one PDCCH is used to indicate to send the uplink data and receive the downlink data, 16-bit CRC overheads can be saved. As shown in FIG. 2, a second PDCCH includes both DCI for scheduling the downlink data packet and DCI for scheduling the uplink data packet.

Optionally, in step 102, the base station performs, by using higher layer signaling, semi-static configuration on modes of data packets scheduled by using the first DCI and the second DCI. Further, the base station may separately perform semi-static configuration on an uplink data packet mode and a downlink data packet mode by using the higher layer signaling. A data packet mode includes a short-TTI data packet and a 1-ms data packet. Optionally, a TTI of the short-TTI data packet is less than a length of 1 subframe or less than 1 ms in a time domain.

When the base station configures the data packet mode as the 1-ms data packet, the base station sends, in the PDCCH area, the DCI for indicating the terminal device to receive or send the 1-ms data packet, for example, DCI whose DCI format is 0/1/1A/1B/1D/2/2A/2B/2C/2D/4. When sending DCI whose DCI format is 1/1A/1B/1D/2/2A/2B/2C/2D, the base station indicates the terminal device to receive a 1-ms downlink data packet. When sending DCI whose DCI format is 0/4, the base station indicates the terminal device to send a 1-ms uplink data packet. In this case, the base station does not send the first DCI and the second DCI.

When the base station configures the data packet mode as the short-TTI data packet, the base station may send scheduling information used when the first DCI is used to indicate the terminal device to receive and/or send the short-TTI data packet, and send the second DCI to indicate the terminal device to receive and/or send the short-TTI data packet according to the scheduling information indicated by the first DCI. In addition, because there is a fuzzy period between the base station and the terminal device in a higher layer signaling switching period, the base station and the terminal device do not know a data packet mode of each other. Therefore, optionally, the base station may further send DCI whose DCI format is 1A/0 in the PDCCH area. When the base station sends the DCI whose DCI format is 1A/0, the base station schedules the 1-ms downlink data packet or the 1-ms uplink data packet. In this way, the base station may send the DCI whose DCI format is 1A/0 in a data packet mode switching period, so as to avoid a problem, caused by the fuzzy period, that behavior of the base station is not consistent with that of the terminal device.

Optionally, to reduce a quantity of times of blind PDCCH detection of the terminal device, a quantity of bits of the first DCI may be configured to be the same as that of downlink control information whose DCI format is 1A/0.

For semi-static configuration, when the base station configures the data packet mode as the 1-ms data packet, the terminal device only needs to detect DCI indicating the 1-ms data packet. When the base station configures the data packet mode as the short-TTI data packet, the terminal device only needs to detect the first DCI and the second DCI, or detects the DCI whose DCI format is 1A/0.

In addition, the base station may further dynamically configure the data packet mode. Compared with the semi-static configuration, in this case, the terminal device cannot know the data packet mode in advance. Therefore, the terminal device always detects the DCI indicating the 1-ms data packet, the first DCI, and the second DCI. Consequently, a quantity of times of blind detection is relatively large.

Step 140: The base station sends the second DCI to the terminal device.

Step 140 may be implemented by using three schemes:

In a scheme 1, the second DCI is carried on a second PDCCH.

Step 140 may further include some or all of the following several steps. Preferably, step 140 includes all of the following steps in the present disclosure.

Step 140-1: The base station configures a second PDCCH, where the second PDCCH is used to carry the second DCI.

First, the base station may determine an aggregation level of the second PDCCH, and select a PDCCH as the second PDCCH from search space corresponding to the aggregation level. Preferably, the second PDCCH is in the PDSCH area.

A PDCCH is formed by aggregation of L control channel elements (CCEs), and L is a positive integer and referred to as an aggregation level (aggregation level). Usually, L may be 1, 2, 4, or 8. For example, if a PDCCH is formed by aggregation of two CCEs, an aggregation level of the PDCCH is 2.

The base station may determine a to-be-used aggregation level according to a channel state of the terminal device. When the channel state is poor, a higher aggregation level such as a level 8 is selected. When the channel state is favorable, a lower aggregation level such as a level 1 is selected.

After the base station transmits the DCI to the terminal device, in theory, the terminal device needs to detect all PDCCH locations, PDCCH aggregation levels, and DCI formats. Therefore, the terminal device needs to perform blind detection on all combinations to determine a PDCCH that is to be sent to the terminal device. To reduce computation amount and power consumption of a terminal device, a group of limited CCE locations are defined for each terminal device in LTE to place the PDCCH configured for the terminal device. A CCE resource set that the terminal device searches for the PDCCH of the terminal device may be used as search space. Specifically, each aggregation level is corresponding to one piece of search space. Because each PDCCH is formed by aggregation of one or more CCEs, the search space may also be considered as a set of one or more PDCCHs. Each PDCCH is a PDCCH candidate. Optionally, in step 140-1, the base station determines that the search space corresponding to each aggregation level includes only one PDCCH candidate.

The base station selects a PDCCH as the second PDCCH from the search space corresponding to the aggregation level. For example, after the base station determines that the aggregation level is 2, the base station needs to select a PDCCH including two consecutive CCEs as the second PDCCH from search space corresponding to the aggregation level 2. If the base station determines that the search space corresponding to each aggregation level includes only one PDCCH candidate in step 140-1, the base station directly selects the PDCCH candidate as the second PDCCH. When the search space corresponding to the aggregation level includes multiple PDCCH candidates, the base station may select one thereof as the second PDCCH. For example, the base station may use, as the second PDCCH, a first idle PDCCH candidate of an aggregation level 2 in the search space.

Step 140-2: The base station sends the second DCI to the terminal device based on the second PDCCH.

Optionally, a modulation scheme used for a current PDCCH is QPSK by default. Therefore, to reduce PDCCH overheads, the base station may configure that the second PDCCH and the downlink short-TTI data packet use a same modulation scheme.

Preferably, the second PDCCH is terminal device-specified. The CRC used for the second PDCCH is scrambled by using a terminal device-specified RNTI, for example, a C-RNTI or an SPS C-RNTI.

According to step 140-2, the base station configures the second DCI, and adds the CRC used for the second DCI. For example, the base station scrambles the second DCI by using the RNTI, and then performs channel coding and rate matching on the second DCI to which the CRC is added, and sends the second DCI to the terminal device by mapping the second DCI to a time-frequency domain by means of modulation.

In a scheme 2, the second DCI is in the PDSCH area.

The second DCI may be carried by using the PDSCH. In this way, before receiving the second DCI, the terminal device needs to first obtain scheduling information of the PDSCH for carrying the second DCI, for example, the RA and the MCS. Optionally, the scheduling information may be predefined in a standard, or may be configured by the base station and then notified to the terminal device by using the higher layer signaling or the physical layer signaling.

In a scheme 3, the second DCI is indicated by using different reference signals.

Optionally, multiple reference signals are predefined in a standard, and different reference signals indicate different content of the second DCI. After determining content of the second DCI, the base station selects a reference signal corresponding to the content, and sends the reference signal to the terminal device.

Alternatively, optionally, the base station configures multiple reference signals, and notifies, by using the higher layer signaling, the terminal device of DCI content indicated by each reference signal. Further, after determining content of the second DCI, the base station selects a reference signal corresponding to the content, and sends the reference signal to the terminal device.

Step 150: The base station performs transmission of a first data packet with the terminal device.

In conclusion, this example of the present disclosure provides a scheme for scheduling the short-TTI data packet. That is, by using a mechanism in which the first downlink control information (DCI) and the second downlink control information (DCI) are separately sent is used, the first DCI is used to indicate the scheduling information used when the terminal device receives/sends the data packet, and the second DCI is used to indicate the terminal device to receive/send the data packet. Therefore, a technical problem that the current PDCCH cannot support a data packet whose TTI is less than 1 ms is resolved, and the terminal device flexibly sends/receives the data packet, so as to improve data transmission performance.

Figure 3:
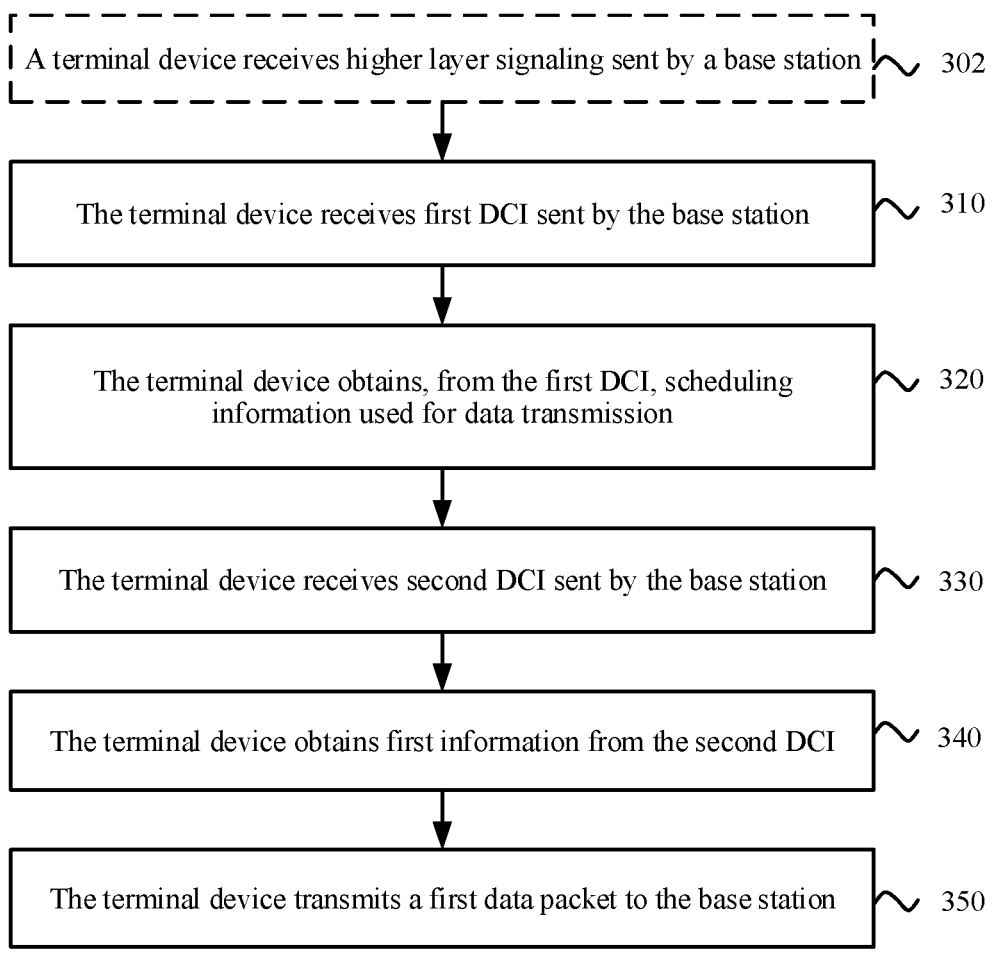
FIG. 3 is a schematic flowchart of a data transmission method according to an example of the present disclosure.

FIG. 3 is a schematic flowchart of a data transmission method according to another example of the present disclosure. The method in FIG. 3 is performed by a terminal device.

Step 310: The terminal device receives first downlink control information (DCI) sent by a base station, where the first DCI includes scheduling information used for data transmission.

Optionally, the terminal device receives, in a physical downlink control channel (PDCCH) area, the first DCI sent by the base station. That is, a first PDCCH is used to carry the first DCI, and the first PDCCH is in the PDCCH area.

Preferably, the PDCCH area and a PDSCH area are based on time division, that is, the PDCCH area and the PDSCH area are on different symbols. A downlink data packet transmitted by the base station to the terminal device is carried by using a PDSCH. The PDCCH area is formed by symbols used to transmit a PDCCH, and one PDCCH area may include multiple PDCCHs. The PDSCH area is formed by symbols used to transmit a PDSCH.

Correspondingly, step 310 may include: obtaining, by the terminal device, a first PDCCH, where the first PDCCH is used to carry the first DCI; and obtaining, by the terminal device from the first PDCCH by means of interpretation, the first DCI sent by the base station.

Optionally, the first PDCCH may be terminal device-specified or group-specified. When the first PDCCH is terminal device-specified, the terminal device descrambles a cyclic redundancy check (CRC) of the first PDCCH by using a terminal device-specific radio network temporary identifier (RNTI). Optionally, multiple terminal devices with a same RNTI may be used as a group of terminal devices. When the first PDCCH is group-specified, an RNTI specified to this group of terminal devices may be used to descramble the CRC of the first PDCCH.

Step 320: The terminal device obtains, from the first DCI, the scheduling information used for data transmission.

Optionally, the first DCI includes at least one piece of information of resource allocation (RA), a modulation and coding scheme (MCS), precoding, an antenna port, or a quantity of layers (number of layers). Definitions of the first DCI and data transmission are described in step 110, and details are not described herein again.

Optionally, before the terminal device receives the first DCI sent by the base station, the terminal device receives a time period T configured by the base station, and receives, based on the time period T, the first DCI sent by the base station. For example, the terminal device receives, at an interval of the time period T, the first DCI sent by the base station. Optionally, when the terminal device does not receive the first DCI, it indicates that the first DCI is not updated. Optionally, the terminal device receives signaling that is sent by the base station and that indicates the time period T.

Optionally, the time period T may be configured according to a time period for reporting channel information by the terminal device. The channel information is channel state information (CSI) or a wideband channel quality indicator (CQI). The wideband CQI and the CSI have been described in detail in step 110 in FIG. 1. Details are not further described herein again.

Optionally, the first DCI includes at least one set of scheduling information, and each set of scheduling information includes the at least one piece of information of the resource allocation (RA), the modulation and coding scheme (MCS), the precoding, the antenna port, or the quantity of layers. Optionally, when the first DCI includes at least two sets of scheduling information, second DCI includes information dynamically indicating a set of scheduling information that is to be used. The second DCI is further described in step 340.

Optionally, two cases exist: the first DCI may be used to schedule downlink data, and the first DCI may be used to schedule uplink data. For details, refer to the detailed description in step 110 in FIG. 1.

In a first case, the first DCI is used to schedule the downlink data.

In a second case, the first DCI is used to schedule the uplink data.

Optionally, in the second case, the first DCI includes a set of scheduling information used to indicate the terminal device to individually send the CSI on a PUSCH. That is, on the PUSCH, the terminal device does not send a transport block for carrying an uplink shared channel (UL-SCH), but sends only a control information feedback of a report mode of a current PUSCH. Optionally, in this case, the second DCI may include information indicating the set of scheduling information, and obtaining of the second DCI is further described in step 340 in FIG. 3.

Optionally, the first DCI may be used to individually schedule the downlink data or the uplink data. In this case, the first DCI further needs to include hybrid automatic repeat request (HARQ)-related information.

Step 330: The terminal device receives second DCI sent by the base station.

Step 330 may be implemented by using three schemes:

In a scheme 1, the second DCI is carried on a second PDCCH.

In this scheme, the terminal device obtains the second PDCCH, the second PDCCH is used to carry the second DCI, and the terminal device obtains, from the second PDCCH by means of interpretation, the second DCI sent by the base station. Preferably, the second PDCCH is in the PDSCH area.

For example, after receiving PDCCH information of the base station, the terminal device confirms, in search space, a PDCCH allocated to the terminal device.

Optionally, a modulation scheme used for a current PDCCH is QPSK by default. Therefore, to reduce PDCCH overheads, the base station may configure that the second PDCCH and a downlink short-TTI data packet use a same modulation scheme.

Preferably, the second PDCCH is terminal device-specified. The CRC used for the second PDCCH is scrambled by using a terminal device-specified RNTI, for example, a C-RNTI or an SPS C-RNTI.

In a scheme 2, the second DCI is in the PDSCH area.

The second DCI may be carried by using the PDSCH. In this way, before receiving the second DCI, the terminal device needs to first obtain scheduling information of the PDSCH for carrying the second DCI, for example, the RA and the MCS. Optionally, the scheduling information may be predefined in a standard, or may be configured by the base station and then notified to the terminal device by using higher layer signaling or physical layer signaling.

In a scheme 3, the second DCI is indicated by using different reference signals.

Optionally, multiple reference signals are predefined in a standard, and different reference signals indicate different content of the second DCI. After the base station determines content of the second DCI, the terminal device receives a corresponding reference signal sent by the base station.

Alternatively, optionally, the terminal device receives DCI content that is indicated by the multiple reference signals and notified by using higher layer signaling. Further, after the base station determines the content of the second DCI, the terminal device receives a corresponding reference signal sent by the base station.

Step 340: The terminal device obtains first information from the second DCI, where the first information includes information used to indicate the terminal device to perform transmission of a first data packet with the base station according to the first DCI.

Optionally, the second DCI includes at least one piece of information of a HARQ process number, a new data indicator (NDI), or a redundancy version (RV). For the HARQ process number, the new data indicator (NDI), and the redundancy version (RV), refer to step 130 in FIG. 1. Details are not further described herein again.

Optionally, the first DCI may be defined as first-order DCI, and the first DCI or the first-order DCI includes scheduling information used when the terminal device configures a data packet transmitted within a period of time. Regardless of a quantity of data packets that are sent within the period of time, the scheduling information included in the first DCI may be used. Likewise, optionally, it is defined that second-order DCI includes the second DCI, third DCI, and the like. When the second-order DCI is used to indicate the terminal device to receive a downlink data packet or send an uplink data packet, each DCI is used to indicate to transmit a data packet. For example, the second DCI is used to indicate to transmit a first data packet, and the third DCI is used to indicate to transmit a second data packet. That is, after receiving a notification of the second DCI, the terminal device performs transmission of the first data packet with the base station according to scheduling information included in the first DCI and the second DCI. After receiving a notification of the third DCI, the terminal device performs transmission of the second data packet with the base station according to scheduling information included in the first DCI and the third DCI. When the second-order DCI is used to indicate the terminal device to receive the downlink data packet and send the uplink data packet, the second-order DCI may be used to indicate to transmit the two data packets. For example, a first message in the second DCI is used to indicate to receive the first data packet, that is, the downlink data packet, and a second message in the second DCI is used to indicate to send the second data packet, that is, the uplink data packet. That is, after receiving a notification of the second DCI, the terminal device receives the first data packet according to the scheduling information included in the first DCI and the second DCI. After receiving a notification of the third DCI, the terminal device sends the second data packet according to the scheduling information included in the first DCI and the third DCI.

Optionally, the first PDCCH for carrying the first-order DCI is not used to carry the second-order DCI.

A status of the second-order DCI is described below by using the second DCI as an example.

As described above, three cases exist: the second DCI may be used to indicate the terminal device to receive the downlink data packet, the second DCI may be used to indicate the terminal device to send the uplink data packet, and the second DCI may be used to indicate the terminal device to receive the downlink data packet and send the uplink data packet. The three cases are described below.

In a first case, the second DCI is used to indicate the terminal device to receive the downlink data packet.

In this case, when or after the terminal device receives the second DCI sent by the base station, the terminal device receives the downlink data packet sent by the base station. It should be understood that, when the downlink data packet and the second DCI occupy a completely same symbol or a partially same symbol, it may be considered that the terminal device receives the downlink data packet when receiving the second DCI sent by the base station. For example, when a downlink short-TTI data packet occupies one symbol, the second DCI and the downlink short-TTI data packet are on the symbol. That is, the terminal device receives the second DCI and the downlink short-TTI data packet on the symbol. When the downlink short-TTI data packet occupies at least two symbols, the second DCI and the downlink short-TTI data packet occupy a completely same symbol or a partially same symbol.

Alternatively, optionally, the second DCI is used to notify the terminal device of a downlink data packet that needs to be received later. For example, the terminal device receives a short-TTI data packet on a $k^{th}$ symbol following a last symbol occupied by the second DCI, and k is a positive integer. Alternatively, the terminal device receives a short-TTI data packet on an $n^{th}$ symbol following a first symbol occupied by the second DCI, and n is a positive integer greater than a quantity of symbols occupied by DCI. For example, if the DCI occupies 2 symbols, n is a positive integer greater than 2. In this case, it may be considered that the terminal device receives the downlink data packet after receiving the second DCI sent by the base station.

In a second case, the second DCI is used to indicate the terminal device to send the uplink data packet.

The second DCI is at a downlink TTI, and an uplink short-TTI data packet sent by the terminal device to the base station is at an uplink TTI. Because the terminal device requires a period of processing time to interpret the second DCI and prepare the uplink short-TTI data packet, the second DCI should be sent before the uplink short-TTI data packet. For example, the terminal device sends the uplink short-TTI data packet on a $k^{th}$ symbol following a last symbol occupied by the second DCI, and k is a positive integer. Alternatively, the terminal device sends the short-TTI data packet on an nth symbol following a first symbol occupied by the second DCI, and n is a positive integer greater than a quantity of symbols occupied by DCI. For example, if the DCI occupies 2 symbols, n is a positive integer greater than 2.

Optionally, when the uplink short-TTI data packet uses a synchronized HARQ, the second DCI includes at least one piece of information of the NDI or the RV. Optionally, when the uplink short-TTI data packet uses an asynchronized HARQ, the second DCI includes the at least one piece of information of the HARQ process number, the NDI, or the RV.

Optionally, when the first DCI includes at least two sets of scheduling information, the second DCI further includes a scheduling configuration indication. The scheduling configuration indication is used to notify the terminal device of a set of scheduling information that is to be used by the terminal device to receive the downlink data packet and/or send the uplink data packet.

Optionally, the second DCI may further include CSI request information. When the terminal device receives the CSI request information configured by the base station which indicates no aperiodic CSI reporting, the terminal device does not send the aperiodic CSI, but sends only the transport block for carrying the UL-SCH. When the CSI request information that is received by the terminal device and configured by the base station is that the terminal device reports aperiodic CSI, the terminal device sends the aperiodic CSI and the transport block for carrying the UL-SCH.

It should be noted that, when the first DCI includes a set of scheduling information used by the terminal device to individually send the CSI on the PUSCH, the scheduling configuration indication in the second DCI is to use the set of scheduling information, and/or the CSI request information indicates the terminal device to report the aperiodic CSI, and indicates the terminal device to individually send the CSI on the PUSCH.

In a third case, the second DCI is used to indicate the terminal device to receive the downlink data packet and send the uplink data packet.

The second DCI includes two information fields. One information field indicates the terminal device to receive the downlink data packet, and includes information described in the first case, for example, includes the at least one piece of information of the HARQ process number, the NDI, or the RV. The other information field indicates the terminal device to send the uplink data packet, and includes information described in the second case, for example, includes at least one piece of information of the NDI, the RV, or a CSI request when the uplink short-TTI data packet uses the synchronized HARQ, or includes at least one piece of information of the HARQ process number, the NDI, the RV, or the CSI when the uplink short-TTI data packet uses the asynchronized HARQ.

In this case, the terminal device obtains the second DCI, and the second DCI is used to indicate the terminal device to send the uplink short-TTI data packet and receive the downlink short-TTI data packet. The second DCI is sent before the uplink short-TTI data packet that needs to be sent by the terminal device.

It should be noted that, when the PDCCH is used to carry the second DCI (for details, refer to the scheme 1 of step 320), if two PDCCHs are used to respectively indicate to send the uplink data and receive the downlink data, two CRCs are required. If one PDCCH is used to indicate to send the uplink data and receive the downlink data, 16-bit CRC overheads can be saved. As shown in FIG. 2, the second PDCCH includes both DCI for scheduling the downlink data and DCI for scheduling the uplink data.

Optionally, in step 302, the terminal device receives higher layer signaling of the base station, and the higher layer signaling indicates modes of data packets scheduled by using the first DCI and the second DCI. That is, before the terminal device receives the first DCI sent by the base station, the method further includes: receiving, by the terminal device, the higher layer signaling sent by the base station. The higher layer signaling indicates that the first data packet is the short-TTI data packet.

A data packet mode includes a short-TTI data packet and a 1-ms data packet. The base station performs, by using the higher layer signaling, semi-static configuration on the modes of the data packets scheduled by using the first DCI and the second DCI. For details, refer to step 102. Details are not further described herein again.

In conclusion, this example of the present disclosure provides a scheme for scheduling the short-TTI data packet. That is, by separately receiving the first-order DCI and the second-order DCI, the terminal device obtains the scheduling information that is in the first DCI and used to indicate the terminal device to transmit the data packet, and the second DCI is used to indicate the terminal device to receive/send the data packet. Therefore, a technical problem that the current PDCCH cannot support a data packet whose TTI is less than 1 ms is resolved, and the terminal device flexibly transmits the data packet, so as to improve data transmission performance.

Figure 4:
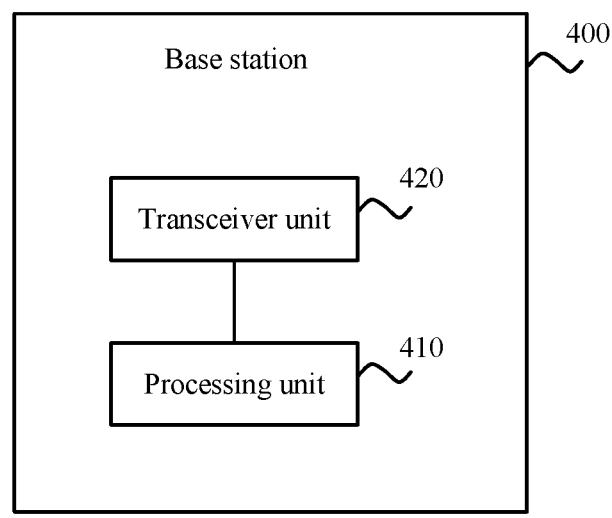
FIG. 4 is a schematic structural diagram of a terminal device according to an example of the present disclosure.

FIG. 4 is a schematic diagram of a base station according to an example of the present disclosure. A base station 400 in FIG. 4 includes a transceiver unit 420 and a processing unit 410. The transceiver unit 420 and the processing unit 410 are connected. Optionally, the transceiver unit 420 may include a receiving unit and a sending unit that respectively implement functions of receiving data and sending data.

The processing unit 410 is configured to configure first downlink control information (DCI) for a terminal device. The first DCI includes scheduling information used for data transmission.

The transceiver unit 420 is configured to send the first DCI to the terminal device.

Optionally, in an example, the first DCI includes at least one piece of information of resource allocation (RA), a modulation and coding scheme (MCS), precoding, an antenna port, or a quantity of layers (number of layers). For detailed definitions of the first DCI and data transmission, refer to step 110 in FIG. 1. Details are not further described herein again.

Optionally, in an example, the processing unit 410 is further configured to configure a time period T, and configured to control the transceiver unit 420 to send the first DCI to the terminal device based on the time period T. For example, the base station sends the first DCI to the terminal device at an interval of the time period T.

Optionally, in another example, the processing unit 410 may control the transceiver unit 420 to send the first DCI in a semi-persistent sending manner. In this case, the base station sends the first DCI to the terminal device based on the time period T. For example, the processing unit 410 detects, at an interval of a time period, whether the first DCI is updated, and sends the first DCI to the terminal device when the first DCI is updated.

Optionally, the time period T may be configured according to a time period for reporting channel information by the terminal device. The channel information is channel state information (CSI) or a wideband channel quality indicator (CQI).

Optionally, the first DCI includes at least one set of scheduling information, and each set of scheduling information includes the at least one piece of information of the RA, the MCS, the precoding, the antenna port, or the quantity of layers (number of layers).

Optionally, when the base station configures that the first DCI includes at least two sets of scheduling information, the base station may dynamically indicate, in second DCI, a set of scheduling information that is to be used. When a first PDCCH is group-specified, preferably, the first DCI includes at least two sets of scheduling information.

Optionally, two cases exist: the first DCI may be used to schedule downlink data, and the first DCI may be used to schedule uplink data. For details, refer to the detailed description in step 110 in FIG. 1.

In a first case, the first DCI is used to schedule the downlink data.

In a second case, the first DCI is used to schedule the uplink data.

Optionally, in the second case, the first DCI includes a set of scheduling information used to indicate the terminal device to individually send the CSI on a PUSCH. That is, on the PUSCH, the terminal device does not send a transport block for carrying an uplink shared channel (UL-SCH), but sends only a control information feedback of a report mode of a current PUSCH. Optionally, in this case, the second DCI may include information indicating the set of scheduling information.

Optionally, the transceiver unit 420 sends the first DCI by carrying the first DIC on a first physical downlink control channel (PDCCH), and the first PDCCH is in a PDCCH area.

Correspondingly, the transceiver unit 420 may configure the first PDCCH, and the first PDCCH is used to carry the first DCI. The transceiver unit 420 sends the first PDCCH to the terminal device by using the first PDCCH. The first PDCCH for carrying the first DCI is not used to carry the second DCI.

Preferably, the PDCCH area and a PDSCH area are based on time division, that is, the PDCCH area and the PDSCH area are on different symbols. The PDCCH area is formed by symbols used to transmit a PDCCH, and one PDCCH area may include multiple PDCCHs. The PDSCH area is formed by symbols used to transmit a PDSCH. The PDSCH area includes a symbol other than that of the PDCCH area in each subframe. A quantity of symbols of the PDSCH area may be indicated by using a PCFICH or higher layer signaling.

Optionally, the first PDCCH may be terminal device-specified or group-specified. For different scrambling manners, refer to the description in step 120 in FIG. 1.

The processing unit 410 is further configured to configure second DCI for the terminal device. The second DCI includes first information. The first information includes information used to indicate the terminal device to perform transmission of a first data packet with the base station according to the first DCI.

Optionally, the second DCI includes at least one piece of information of a HARQ process number, a new data indicator (NDI), or a redundancy version (RV). For the HARQ process number, the new data indicator (NDI), and the redundancy version (RV), refer to step 130 in FIG. 1. Details are not further described herein again.

Optionally, the processing unit 410 may define the first DCI as first-order DCI, and the first DCI or the first-order DCI includes scheduling information used when the terminal device configures a data packet transmitted within a period of time. Regardless of a quantity of data packets that are sent within the period of time, the scheduling information included in the first DCI may be used. Likewise, optionally, the processing unit 410 defines that second-order DCI includes the second DCI, third DCI, and the like. When the second-order DCI is used to indicate the terminal device to receive a downlink data packet or send an uplink data packet, each DCI is used to indicate to transmit a data packet. For example, the second DCI is used to indicate to transmit a first data packet, and the third DCI is used to indicate to transmit a second data packet. That is, after receiving a notification of the second DCI, the terminal device performs transmission of the first data packet with the base station according to scheduling information included in the first DCI and the second DCI. After receiving a notification of the third DCI, the terminal device performs transmission of the second data packet with the base station according to scheduling information included in the first DCI and the third DCI. When the second-order DCI is used to indicate the terminal device to receive the downlink data packet and send the uplink data packet, the second-order DCI may be used to indicate to transmit the two data packets. For example, a first message in the second DCI is used to indicate to receive the first data packet, that is, the downlink data packet, and a second message in the second DCI is used to indicate to send the second data packet, that is, the uplink data packet. That is, after receiving a notification of the second DCI, the terminal device receives the first data packet according to the scheduling information included in the first DCI and the second DCI. After receiving a notification of the third DCI, the terminal device sends the second data packet according to the scheduling information included in the first DCI and the third DCI.

Optionally, the processing unit 410 may configure the first-order DCI and the second-order DCI at the same time. The transceiver unit 420 preferably sends the first-order DCI, and then sends the second-order DCI. That is, the first DCI should be sent before the second DCI, the third DCI, and the like. Likewise, optionally, the processing unit 410 may first configure the first-order DCI; then, the transceiver unit 420 sends the first-order DCI; next, the processing unit 410 configures the second-order DCI before the transceiver unit 420 sends the second-order DCI each time. It may be understood that, when two pieces of DCI: the first-order DCI and the second-order DCI are used for scheduling when each data packet is transmitted, a specific configuration sequence and a sending sequence of the first-order DCI and the second-order DCI by the processing unit 410 and the transceiver unit 420 are not limited in the present disclosure.

Optionally, the first PDCCH for carrying the first-order DCI is not used to carry the second-order DCI.

The second-order DCI is used to indicate the terminal device to receive the downlink data packet and/or send the uplink data packet. Because a transmission requirement of the downlink data packet and/or the uplink data packet occurs in real time, the processing unit 410 needs to dynamically send the second-order DCI to the terminal device according to a requirement.

As described above, three cases exist: the second DCI may be used to indicate the terminal device to receive the downlink data packet, the second DCI may be used to indicate the terminal device to send the uplink data packet, and the second DCI may be used to indicate the terminal device to receive the downlink data packet and send the uplink data packet. The three cases are described below.

In a first case, the second DCI is used to indicate the terminal device to receive the downlink data packet.

In this case, when or after the transceiver unit 420 sends the second DCI to the terminal device, the base station sends the downlink data packet to the terminal device. It should be understood that, when the downlink data packet and the second DCI that are sent by the transceiver unit 420 to the terminal device occupy a completely same symbol or a partially same symbol, it may be considered that the transceiver unit 420 sends the downlink data packet when sending the second DCI to the terminal device.

Alternatively, optionally, the second DCI sent by the transceiver unit 420 is used to notify the terminal device of a downlink data packet that needs to be received later. For example, the transceiver unit 420 sends a short-TTI data packet on a $k^{th}$ symbol following a last symbol occupied by the second DCI, and k is a positive integer. Alternatively, the transceiver unit 420 sends a short-TTI data packet on an $n^{th}$ symbol following a first symbol occupied by the second DCI, and n is a positive integer greater than a quantity of symbols occupied by DCI. For example, if the DCI occupies 2 symbols, n is a positive integer greater than 2. In this case, it may be considered that the transceiver unit 420 sends the downlink data packet after sending the second DCI to the terminal device.

In a second case, the second DCI is used to indicate the terminal device to send the uplink data packet.

The second DCI is at a downlink TTI, and an uplink short-TTI data packet sent by the transceiver unit 420 to the base station is at an uplink TTI. Because the terminal device requires a period of processing time to interpret the second DCI and prepare the uplink short-TTI data packet, the second DCI should be sent before the uplink short-TTI data packet. For example, the transceiver unit 420 receives, on a $k^{th}$ symbol following a last symbol occupied by the second DCI, the uplink short-TTI data packet sent by the terminal device, and k is a positive integer. Alternatively, the transceiver unit 420 receives, on an $n^{th}$ symbol following a first symbol occupied by the second DCI, the uplink short-TTI data packet sent by the terminal device, and n is a positive integer greater than a quantity of symbols occupied by DCI. For example, if the DCI occupies 2 symbols, n is a positive integer greater than 2.

Optionally, when the uplink short-TTI data packet uses a synchronized HARQ, the second DCI includes at least one piece of information of the NDI or the RV.

Optionally, when the first DCI includes at least two sets of scheduling information, the second DCI further includes a scheduling configuration indication.

Optionally, the second DCI may further include CSI request information. When the CSI request information configured by the processing unit 410 is that the terminal device does not report aperiodic CSI, the terminal device does not send the aperiodic CSI, but sends only the transport block for carrying the UL-SCH. When the CSI request information configured by the processing unit 410 is that the terminal device reports aperiodic CSI, the terminal device sends the aperiodic CSI and the transport block for carrying the UL-SCH.

It should be noted that, when the first DCI includes a set of scheduling information used by the terminal device to individually send the CSI on the PUSCH, the processing unit 410 may configure that the scheduling configuration indication in the second DCI is using the set of scheduling information, and/or, the base station configures that the CSI request information is indicating the terminal device to report the aperiodic CSI, and indicating the terminal device to individually send the CSI on the PUSCH.

In a third case, the second DCI is used to indicate the terminal device to receive the downlink data packet and send the uplink data packet. This case is the same as the case that is described in step 130 in FIG. 1 and in which the second DCI is used to indicate the terminal device to receive the downlink data packet and send the uplink data packet. Details are not further described herein again.

The second DCI includes two information fields, one information field indicates the terminal device to receive the downlink data packet, and the other information field indicates the terminal device to send the uplink data packet.

In this case, the base station configures the second DCI, and the second DCI is used to indicate the terminal device to send the uplink short-TTI data packet and receive a downlink short-TTI data packet.

Optionally, the processing unit 410 performs, by using the higher layer signaling, semi-static configuration on modes of data packets scheduled by using the first DCI and the second DCI. Further, the processing unit 410 may separately perform semi-static configuration on an uplink data packet mode and a downlink data packet mode by using the higher layer signaling. A data packet mode includes a short-TTI data packet and a 1-ms data packet. The processing unit 410 performs, by using the higher layer signaling, semi-static configuration on the modes of the data packets scheduled by using the first DCI and the second DCI. This is the same as that of step 102 in FIG. 1. Details are not further described herein again.

In addition, the processing unit 410 may further dynamically configure the data packet mode. Compared with the semi-static configuration, in this case, the terminal device cannot know the data packet mode in advance. Therefore, the terminal device always detects DCI indicating the 1-ms data packet, the first DCI, and the second DCI. Consequently, a quantity of times of blind detection is relatively large.

The transceiver unit 420 is further configured to send the second DCI to the terminal device. The second DCI may be sent by using three schemes. The three schemes are the same as those of step 140 in FIG. 1. Details are not further described herein again.

The transceiver unit 420 is further configured to perform transmission of a first data packet with the terminal device.

In conclusion, in this example of the present disclosure, the base station may schedule the short-TTI data packet. That is, by using a mechanism in which the first-order downlink control information (DCI) and the second-order downlink control information (DCI) are separately sent is used, the scheduling information for transmitting the data packet is added into the first-order DCI, and the information for indicating the terminal device to transmit the data packet is added into the second-order DCI. Therefore, a technical problem that a current PDCCH cannot support a data packet whose TTI is less than 1 ms is resolved, and the terminal device flexibly transmits the data packet, so as to improve data transmission performance.

Figure 5:
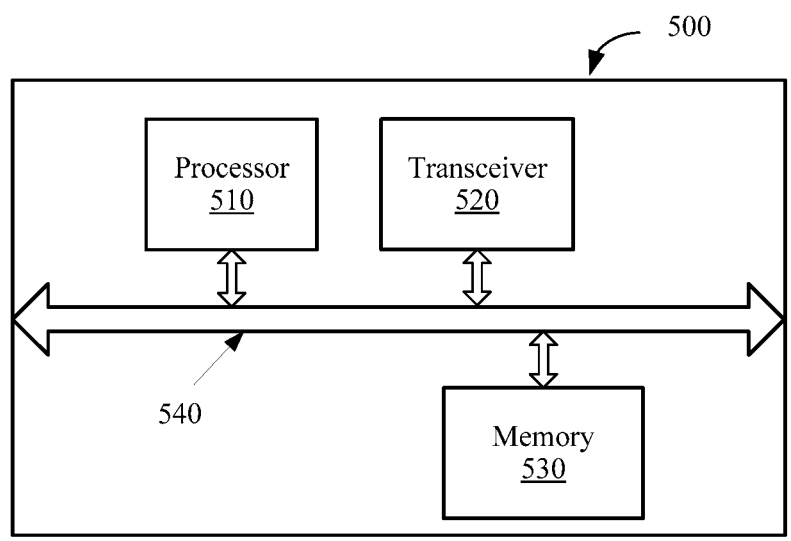
FIG. 5 is a schematic structural diagram of a terminal device according to another example of the present disclosure.

It should be noted that, in this example of the present disclosure, the transceiver unit 420 may be implemented by a transceiver, or a receiving function and a sending function of the transceiver unit 420 may be respectively implemented by a receiver and a transmitter. The processing unit 410 may be implemented by a processor. As shown in FIG. 5, user equipment (UE) 500 may include a processor 510, a transceiver 520, and a memory 530. The memory 530 may be configured to store a program/code that is pre-installed when the UE is delivered from a factory, or may store code or the like executed by the processor 510.

The components of the user equipment 500 are coupled together by using a bus system 540. In addition to a data bus, the bus system 540 further includes a power bus, a control bus, and a status signal bus.

Figure 6:
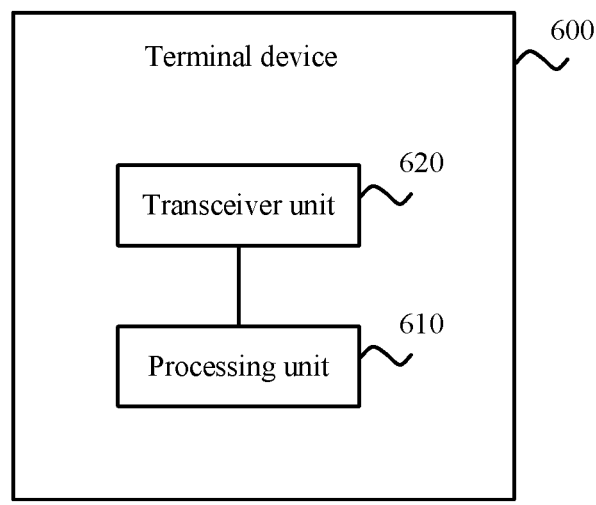
FIG. 6 is a schematic structural diagram of a base station according to an example of the present disclosure.

FIG. 6 is a schematic diagram of a terminal device according to an example of the present disclosure. A terminal device 600 in FIG. 6 includes a processing unit 610 and a transceiver unit 620.

The transceiver unit 620 receives first downlink control information (DCI) sent by a base station. The first DCI includes scheduling information used for data transmission.

Optionally, the transceiver unit 620 receives, in a physical downlink control channel (PDCCH) area, the first DCI sent by the base station. That is, a first PDCCH is used to carry the first DCI, and the first PDCCH is in the PDCCH area.

Preferably, the PDCCH area and a PDSCH area are based on time division, that is, the PDCCH area and the PDSCH area are on different symbols. Definitions of the PDCCH area and the PDSCH area are the same as those of step 120 in FIG. 1. Details are not further described herein again.

Correspondingly, that the transceiver unit 620 receives, in the PDCCH area, the first DCI sent by the base station includes: obtaining, by the transceiver unit 620, a first PDCCH, where the first PDCCH is used to carry the first DCI; and obtaining, by the transceiver unit 620 from the first PDCCH by means of interpretation, the first DCI sent by the base station.

Optionally, the first PDCCH may be terminal device-specified or group-specified. When the first PDCCH is terminal device-specified, the terminal device descrambles a cyclic redundancy check of the first PDCCH by using a terminal device-specific radio network temporary identifier (RNTI). Optionally, multiple terminal devices with a same RNTI may be used as a group of terminal devices. When the first PDCCH is group-specified, an RNTI specified to this group of terminal devices may be used to descramble the CRC of the first PDCCH.

The processing unit 610 obtains, from the first DCI, the scheduling information used for data transmission.

Optionally, the first DCI includes at least one piece of information of resource allocation (RA), a modulation and coding scheme (MCS), precoding, an antenna port, or a quantity of layers (number of layers). Definitions of the first DCI and data transmission are described in step 110 in FIG. 1, and details are not described herein again.

Optionally, before the processing unit 610 receives the first DCI sent by the base station, the transceiver unit 620 receives a time period T configured by the base station, and receives, based on the time period T, the first DCI sent by the base station. For example, the terminal device receives, at an interval of the time period T, the first DCI sent by the base station. Optionally, when the terminal device does not receive the first DCI, it indicates that the first DCI is not updated. Optionally, the transceiver unit 620 receives signaling that is sent by the base station and that indicates the time period T.

Optionally, the time period T may be configured according to a time period for reporting channel information by the transceiver unit 620. The channel information is channel state information (CSI) or a wideband channel quality indicator (CQI). A CQI and the CSI have been described in detail in step 110 in FIG. 1. Details are not further described herein again.

Optionally, the first DCI includes at least one set of scheduling information, and each set of scheduling information includes the at least one piece of information of the resource allocation (RA), the modulation and coding scheme (MCS), the precoding, the antenna port, or the quantity of layers. Optionally, when the first DCI includes at least two sets of scheduling information, second DCI includes information dynamically indicating a set of scheduling information that is to be used.

Optionally, two cases exist: the first DCI may be used to schedule downlink data, and the first DCI may be used to schedule uplink data. For details, refer to the detailed description in step 110 in FIG. 1.

In a first case, the first DCI is used to schedule the downlink data.

In a second case, the first DCI is used to schedule the uplink data.

Optionally, in the second case, the first DCI includes a set of scheduling information used to indicate the terminal device to individually send the CSI on a PUSCH. That is, on the PUSCH, the terminal device does not send a transport block for carrying an uplink shared channel (UL-SCH), but sends only a control information feedback of a report mode of a current PUSCH. Optionally, in this case, the second DCI may include information indicating the set of scheduling information.

Optionally, the first DCI may be used to individually schedule the downlink data or the uplink data. In this case, the first DCI further needs to include hybrid automatic repeat request (HARQ)-related information.

The transceiver unit 620 receives second DCI sent by the base station. The transceiver unit 620 may receive, by using three schemes, the second DCI sent by the base station. For details, refer to step 330 in FIG. 3. Details are not described herein again.

The transceiver unit 620 is further configured to obtain first information from the second DCI. The first information includes information used to indicate the terminal device to perform transmission of a first data packet with the base station according to the first DCI.

Optionally, the second DCI includes at least one piece of information of a HARQ process number, a new data indicator (NDI), or a redundancy version (RV). For the HARQ process number, the new data indicator (NDI), and the redundancy version (RV), refer to step 130 in FIG. 1. Details are not further described herein again.

Optionally, the processing unit 610 may obtain the following information: The base station defines the first DCI as first-order DCI, and the first DCI or the first-order DCI includes scheduling information used when the terminal device configures a data packet transmitted within a period of time. Regardless of a quantity of data packets that are sent within the period of time, the scheduling information included in the first DCI may be used. Likewise, optionally, the processing unit 610 may obtain the following information: The base station defines that second-order DCI includes the second DCI, third DCI, and the like. When the second-order DCI is used to indicate the terminal device to receive a downlink data packet or send an uplink data packet, each DCI is used to indicate to transmit a data packet. For example, the second DCI is used to indicate to transmit a first data packet, and the third DCI is used to indicate to transmit a second data packet. That is, after receiving a notification of the second DCI, the transceiver unit 620 performs transmission of the first data packet with the base station according to scheduling information included in the first DCI and the second DCI. After receiving a notification of the third DCI, the transceiver unit 620 performs transmission of the second data packet with the base station according to scheduling information included in the first DCI and the third DCI. When the second-order DCI is used to indicate the terminal device to receive the downlink data packet and send the uplink data packet, the second-order DCI may be used to indicate to transmit the two data packets. For example, a first message in the second DCI is used to indicate to receive the first data packet, that is, the downlink data packet, and a second message in the second DCI is used to indicate to send the second data packet, that is, the uplink data packet. That is, after receiving a notification of the second DCI, the transceiver unit 620 receives the first data packet according to the scheduling information included in the first DCI and the second DCI. After receiving a notification of the third DCI, the transceiver unit 620 sends the second data packet according to the scheduling information included in the first DCI and the third DCI.

Optionally, the first PDCCH for carrying the first-order DCI is not used to carry the second-order DCI.

A status of the second-order DCI is described below by using the second DCI as an example.

As described above, three cases exist: the second DCI may be used to indicate the terminal device to receive the downlink data packet, the second DCI may be used to indicate the terminal device to send the uplink data packet, and the second DCI may be used to indicate the terminal device to receive the downlink data packet and send the uplink data packet. The three cases are described below.

In a first case, the second DCI is used to indicate the terminal device to receive the downlink data packet.

In this case, when or after the transceiver unit 620 receives the second DCI sent by the base station, the terminal device receives the downlink data packet sent by the base station. It should be understood that, when the downlink data packet and the second DCI occupy a completely same symbol or a partially same symbol, it may be considered that the terminal device receives the downlink data packet when receiving the second DCI sent by the base station. For example, when a downlink short-TTI data packet occupies one symbol, the second DCI and the downlink short-TTI data packet are on the symbol. That is, the terminal device receives the second DCI and the downlink short-TTI data packet on the symbol. When the downlink short-TTI data packet occupies at least two symbols, the second DCI and the downlink short-TTI data packet occupy a completely same symbol or a partially same symbol.

Alternatively, optionally, the second DCI is used to notify the terminal device of a downlink data packet that needs to be received later. For example, the transceiver unit 620 receives a short-TTI data packet on a $k^{th}$ symbol following a last symbol occupied by the second DCI, and k is a positive integer. Alternatively, the transceiver unit 620 receives a short-TTI data packet on an $n^{th}$ symbol following a first symbol occupied by the second DCI, and n is a positive integer greater than a quantity of symbols occupied by DCI. For example, if the DCI occupies 2 symbols, n is a positive integer greater than 2. In this case, it may be considered that the transceiver unit 620 receives the downlink data packet after receiving the second DCI sent by the base station.

In a second case, the second DCI is used to indicate the terminal device to send the uplink data packet.

The second DCI is at a downlink TTI, and an uplink short-TTI data packet sent by the transceiver unit 620 to the base station is at an uplink TTI. Because the terminal device requires a period of processing time to interpret the second DCI and prepare the uplink short-TTI data packet, the second DCI should be sent before the uplink short-TTI data packet. For example, the transceiver unit 620 sends the uplink short-TTI data packet on a $k^{th}$ symbol following a last symbol occupied by the second DCI, and k is a positive integer. Alternatively, the transceiver unit 620 sends the short-TTI data packet on an $n^{th}$ symbol following a first symbol occupied by the second DCI, and n is a positive integer greater than a quantity of symbols occupied by DCI. For example, if the DCI occupies 2 symbols, n is a positive integer greater than 2.

Optionally, when the uplink short-TTI data packet uses a synchronized HARQ, the second DCI includes at least one piece of information of the NDI or the RV. Optionally, when the uplink short-TTI data packet uses an asynchronized HARQ, the second DCI includes the at least one piece of information of the HARQ process number, the NDI, or the RV.

Optionally, when the first DCI includes at least two sets of scheduling information, the second DCI further includes a scheduling configuration indication. The scheduling configuration indication is used to notify the terminal device of a set of scheduling information that is to be used by the terminal device to receive the downlink data packet and/or send the uplink data packet.

Optionally, the second DCI may further include CSI request information. When the transceiver unit 620 receives the CSI request information configured by the base station which indicates no aperiodic CSI reporting, the terminal device does not send the aperiodic CSI, but sends only the transport block for carrying the UL-SCH. When the transceiver unit 620 receives the CSI request information configured by the base station which indicates aperiodic CSI reporting, the terminal device sends the aperiodic CSI and the transport block for carrying the UL-SCH.

It should be noted that, when the first DCI includes a set of scheduling information used by the terminal device to individually send the CSI on the PUSCH, the scheduling configuration indication in the second DCI is to use the set of scheduling information, and/or, the CSI request information indicates the terminal device to report the aperiodic CSI, and indicates the terminal device to individually send the CSI on the PUSCH.

In a third case, the second DCI is used to indicate the transceiver unit 620 to receive the downlink data packet and send the uplink data packet.

The second DCI includes two information fields, one information field indicates the terminal device to receive the downlink data packet, and the other information field indicates the terminal device to send the uplink data packet. Included information is described in the second case. Statuses of the two information fields are the same as those of step 340 in FIG. 3. Details are not further described herein again.

In this case, the processing unit 610 obtains the second DCI, and the second DCI is used to indicate the terminal device to send the uplink short-TTI data packet and receive a downlink short-TTI data packet. The second DCI is sent before the uplink short-TTI data packet that needs to be sent by the terminal device.

It should be noted that, when the PDCCH is used to carry the second DCI (for details, refer to the scheme 1 of step 320 in FIG. 3), if two PDCCHs are used to respectively indicate to send the uplink data and receive the downlink data, two CRCs are required. If one PDCCH is used to indicate to send the uplink data and receive the downlink data, 16-bit CRC overheads can be saved. As shown in FIG. 2, the second PDCCH includes both DCI for scheduling the downlink data and DCI for scheduling the uplink data.

Optionally, the transceiver unit 620 receives higher layer signaling of the base station, and the higher layer signaling indicates modes of data packets scheduled by using the first DCI and the second DCI. A data packet mode includes a short-TTI data packet and a 1-ms data packet. The base station performs, by using the higher layer signaling, semi-static configuration on the modes of the data packets scheduled by using the first DCI and the second DCI. For details, refer to step 130. Details are not further described herein again.

In conclusion, this example of the present disclosure provides a scheme for scheduling the short-TTI data packet. That is, by separately receiving the first-order DCI and the second-order DCI, the terminal device obtains the scheduling information that is in the first DCI and used to indicate the terminal device to transmit the data packet, and the second DCI is used to indicate the terminal device to receive/send the data packet. Therefore, a technical problem that a current PDCCH cannot support a data packet whose TTI is less than 1 ms is resolved, and the terminal device flexibly transmits the data packet, so as to improve data transmission performance.

Figure 7:
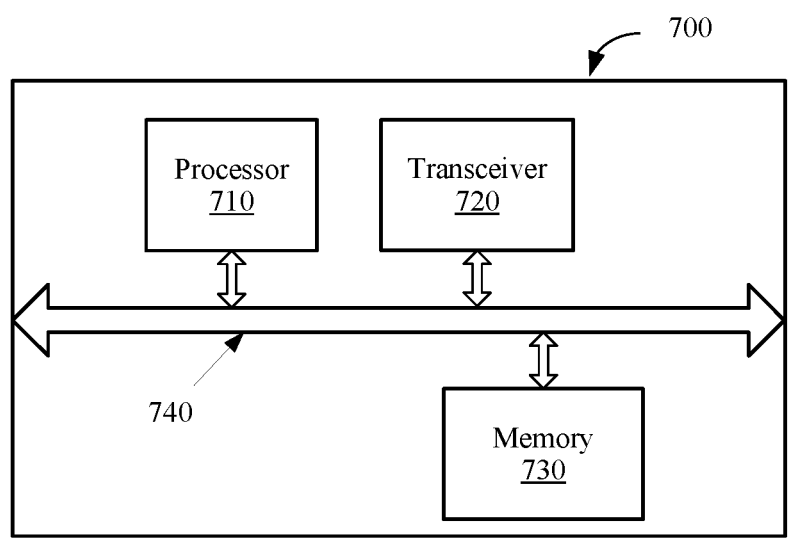
FIG. 7 is a schematic structural diagram of a base station according to another example of the present disclosure.

It should be noted that, in this example of the present disclosure, the transceiver unit 620 may be implemented by a transceiver, or a receiving function and a sending function of the transceiver unit 620 may be respectively implemented by a receiver and a transmitter. The processing unit 610 may be implemented by a processor. As shown in FIG. 7, user equipment 700 may include a processor 710, a transceiver 720, and a memory 730. The memory 730 may be configured to store a program/code that is pre-installed when the UE is delivered from a factory, or may store code or the like executed by the processor 710.

The components of the user equipment 700 are coupled together by using a bus system 740. In addition to a data bus, the bus system 740 further includes a power bus, a control bus, and a status signal bus.

Figure 8:
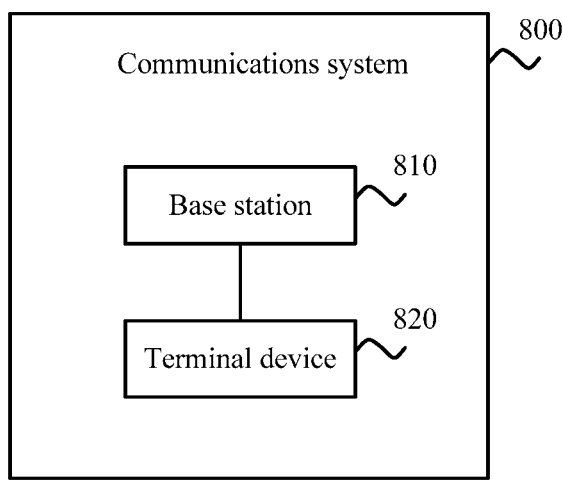
FIG. 8 is a schematic diagram of a communications system according to an example of the present disclosure.

FIG. 8 is a schematic diagram of a communications system according to an example of the present disclosure. A communications system 800 in FIG. 8 includes a base station 810 and a terminal device 820.

The base station 810 is configured to: configure first DCI, and send the first DCI. The first DCI includes scheduling information used for data transmission.

The base station 810 is further configured to: configure second DCI, and send the second DCI. The second DCI includes first information.

The terminal device 820 is configured to: receive the first DCI, and perform transmission of a first data packet with the base station according to a notification of the first information in the second DCI and according to the first DCI.

Optionally, in the communications system 800 in this example of the present disclosure, the base station 810 may be the base station 400 in FIG. 4 or the base station 500 in FIG. 5, and the terminal device 820 may be the terminal device 500 in FIG. 5 or the terminal device 700 in FIG. 7.

A person of ordinary skill in the art may be aware that, in combination with the examples described in the examples disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method examples, and details are not described herein again.

In the several examples provided in this application, it should be understood that the disclosed system, apparatus, and method may be implemented in other manners. For example, the described apparatus example is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the examples.

In addition, functional units in the examples of the present disclosure may be integrated into one processing unit, or each of the units may exist alone physically, or at least two units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the examples of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:
1. A data transmission method, comprising:
configuring, by a base station, first downlink control information (DCI) for a terminal device, wherein the first DCI comprises scheduling information for data transmission;
sending, by the base station, the first DCI to the terminal device;
configuring, by the base station, second DCI for the terminal device, wherein the second DCI comprises first information indicating that the terminal device is to communicate with the base station according to the first DCI with regard to a first data packet;
sending, by the base station, the second DCI to the terminal device; and
sending or receiving, by the base station, the first data packet to or from the terminal device.
2. The method according to claim 1, wherein the second DCI further comprises second information indicating that the terminal device is to communicate according to the first DCI with regard to a second data packet;
wherein the method further comprises: receiving, by the base station, the second data packet from the terminal device; and
wherein the first data packet is a downlink data packet, the second data packet is an uplink data packet, the second DCI comprises two information fields, one of the two information fields is used to carry the first information, and the other of the two information fields is used to carry the second information.

3. The method according to claim 1, wherein the method further comprises:
configuring, by the base station, third DCI for the terminal device, wherein the third DCI comprises third information, and the third information indicates that the terminal device is to communicate according to the first DCI with regard to a third data packet;
sending, by the base station, the third DCI to the terminal device; and
sending or receiving, by the base station, the third data packet to or from the terminal device.

4. The method according to claim 1, wherein sending the first DCI to the terminal device comprises: sending, by the base station, the first DCI to the terminal device in a first physical downlink control channel area; and
wherein sending the second DCI to the terminal device comprises: sending, by the base station, the second DCI to the terminal device in a physical downlink shared channel area, in a second physical downlink control channel area, or in a reference signal.

5. The method according to claim 1, wherein the first DCI comprises at least one set of scheduling information, and the at least one set of scheduling information comprises a set of scheduling information indicating that the terminal device is to send channel state information (CSI) on a physical uplink shared channel (PUSCH), and indicating that the terminal device is not to send a transport block carrying an uplink shared channel (UL-SCH) on the PUSCH.

6. The method according to claim 1, wherein the first DCI comprises at least one set of scheduling information, and each set of scheduling information comprises a resource allocation (RA), a modulation and coding scheme (MCS), a precoding, an antenna port, and/or a quantity of layers.

7. A base station, comprising:
a non-transitory memory having processor-executable instructions stored thereon; and
a processor configured to execute the processor-executable instructions to facilitate:
configuring first downlink control information (DCI) for a terminal device, wherein the first DCI comprises scheduling information for data transmission;
sending, via a transceiver, the first DCI to the terminal device;
configuring second DCI for the terminal device, wherein the second DCI comprises first information indicating that the terminal device is to communicate with the base station according to the first DCI with regard to a first data packet; and
sending, via the transceiver, the second DCI to the terminal device, and sending or receiving the first data packet to or from the terminal device.

8. The base station according to claim 7, wherein the second DCI further comprises second information indicating that the terminal device is to communicate according to the first DCI with regard to a second data packet;
wherein the processor is further configured to execute the processor-executable instructions to facilitate: receiving the second data packet from the terminal device; and
wherein the first data packet is a downlink data packet, the second data packet is an uplink data packet, the second DCI comprises two information fields, one of the two information fields is used to carry the first information, and the other of the two information fields is used to carry the second information.

9. The base station according to claim 7, wherein the processor is further configured to execute the processor-executable instructions to facilitate:
configuring third DCI for the terminal device, wherein the third DCI comprises third information indicating that the terminal device is to communicate according to the first DCI with regard to a third data packet; and
sending, via the transceiver, the third DCI to the terminal device, and sending or receiving the third data packet to or from the terminal device.

10. The base station according to claim 7, wherein the processor is further configured to execute the processor-executable instructions to facilitate:
sending, via the transceiver, the first DCI to the terminal device in a first physical downlink control channel area; and
sending, via the transceiver, the second DCI to the terminal device in a physical downlink shared channel area, in a second physical downlink control channel area, or in a reference signal.

11. The base station according to claim 7, wherein the first DCI comprises at least one set of scheduling information, and the at least one set of scheduling information comprises a set of scheduling information indicating that the terminal device is to send channel state information (CSI) on a physical uplink shared channel (PUSCH), and indicating that the terminal device is not to send a transport block carrying an uplink shared channel (UL-SCH) on the PUSCH.

12. The base station according to claim 7, wherein the first DCI comprises at least one set of scheduling information, and each set of scheduling information comprises a resource allocation (RA), a modulation and coding scheme (MCS), a precoding, an antenna port, and/or a quantity of layers.

13. A device, comprising:
a non-transitory memory having processor-executable instructions stored thereon; and
a processor configured to execute the processor-executable instructions to facilitate:
receiving, via a transceiver, first downlink control information (DCI) and second DCI from a base station; and
obtaining, from the first DCI, scheduling information for data transmission;
obtaining first information from the second DCI, wherein the first information indicates that the device is to communicate with the base station according to the first DCI with regard to a first data packet; and
sending or receiving, via the transceiver, the first data packet to or from the base station.

14. The device according to claim 13, wherein the processor is further configured to execute the processor-executable instructions to facilitate:
obtaining second information from the second DCI, wherein the second information indicates that the device is to communicate according to the first DCI with regard to a second data packet; and
sending, via the transceiver, the second data packet to the base station;
wherein the first data packet is a downlink data packet, the second data packet is an uplink data packet, the second DCI comprises two information fields, one of the two information fields is used to carry the first information, and the other of the two information fields is used to carry the second information.

15. The device according to claim 13, wherein the processor is further configured to execute the processor-executable instructions to facilitate:

receiving, via the transceiver, third DCI from the base station;

obtaining third information from the third DCI, wherein the third information indicates that the device is to communicate according to the first DCI with regard to a third data packet; and sending or receiving, via the transmitter, the third data packet to or from the base station.

16. The device according to claim 13, wherein the processor is further configured to execute the processor-executable instructions to facilitate:

receiving, via the transceiver, the first DCI from the base station in a first physical downlink control channel area; and receiving, via the transceiver, the second DCI from the base station in a physical downlink shared channel area, in a second physical downlink control channel area, or in a reference signal.

17. The device according to claim 13, wherein the first DCI comprises at least one set of scheduling information, and the at least one set of scheduling information comprises a set of scheduling information indicating that the device is to send channel state information (CSI) on a physical uplink shared channel (PUSCH), and indicating that the device is not to send a transport block carrying an uplink shared channel (UL-SCH) on the PUSCH.

18. The device according to claim 13, wherein the first DCI comprises at least one set of scheduling information, and each set of scheduling information comprises a resource allocation (RA), a modulation and coding scheme (MCS), a precoding, an antenna port, and/or a quantity of layers.

* * * * *